United States Patent
Sato

(10) Patent No.: US 7,872,784 B2
(45) Date of Patent: Jan. 18, 2011

(54) IMAGE READING APPARATUS AND IMAGE PROCESSING METHOD

(75) Inventor: Hideo Sato, Tachikawa (JP)

(73) Assignee: Canon Kabushiki Kaisha (JP)

( * ) Notice: Subject to any disclaimer, the term of this patent is extended or adjusted under 35 U.S.C. 154(b) by 314 days.

(21) Appl. No.: 11/774,005

(22) Filed: Jul. 6, 2007

(65) Prior Publication Data

US 2008/0130064 A1   Jun. 5, 2008

(30) Foreign Application Priority Data

Dec. 4, 2006   (JP) .............................. 2006-327633

(51) Int. Cl.
- *G03F 3/08* (2006.01)
- *G06F 15/00* (2006.01)
- *G06F 3/12* (2006.01)
- *G06K 15/00* (2006.01)

(52) U.S. Cl. ........................ 358/518; 358/1.9; 358/1.15; 358/2.1

(58) Field of Classification Search ....................... None
See application file for complete search history.

(56) References Cited

U.S. PATENT DOCUMENTS

| | | | |
|---|---|---|---|
| 5,874,988 A * | 2/1999 | Gu | 348/97 |
| 2002/0012130 A1* | 1/2002 | Bronstein et al. | 358/1.15 |
| 2005/0041267 A1* | 2/2005 | Hirayama | 358/2.1 |
| 2005/0152613 A1 | 7/2005 | Okutsu et al. | |
| 2005/0157319 A1* | 7/2005 | Mizuhashi et al. | 358/1.9 |

FOREIGN PATENT DOCUMENTS

| | | |
|---|---|---|
| JP | 4-371072 A | 12/1992 |
| JP | 2005-020224 A | 1/2005 |
| JP | 2005-202469 A | 7/2005 |
| JP | 2005-210268 A | 8/2005 |
| JP | 2005-304092 A | 10/2005 |
| JP | 2006-157356 A | 6/2006 |

OTHER PUBLICATIONS

Notification of Reasons for Rejection issued in corresponding Japanese Patent Application No. 2006-327633 dated Dec. 5, 2008, which was previously submitted on Jan. 27, 2009 without English translation.

Decision of Rejection issued in corresponding Japanese Patent Application No. 2006-327633 dated Mar. 13, 2009, which was previously submitted on Mar. 31, 2009 without English translation.

* cited by examiner

*Primary Examiner*—Twyler L Haskins
*Assistant Examiner*—Barbara D Reinier
(74) *Attorney, Agent, or Firm*—Rossi, Kimms & McDowell LLP

(57) ABSTRACT

Upon reading images of both sides of a document sheet, the color reproducibilities of identical background images read from the two faces of each document sheet over a large number of pages are adjusted. Hence, a first background color read by a first reader, and a second background color read by a second reader are respectively extracted, and color processing parameters of a first or second color processor are adjusted, so as to make the output from the first color processor for the first background color be approximately equal to the output from a second color processor for the second background color.

6 Claims, 26 Drawing Sheets

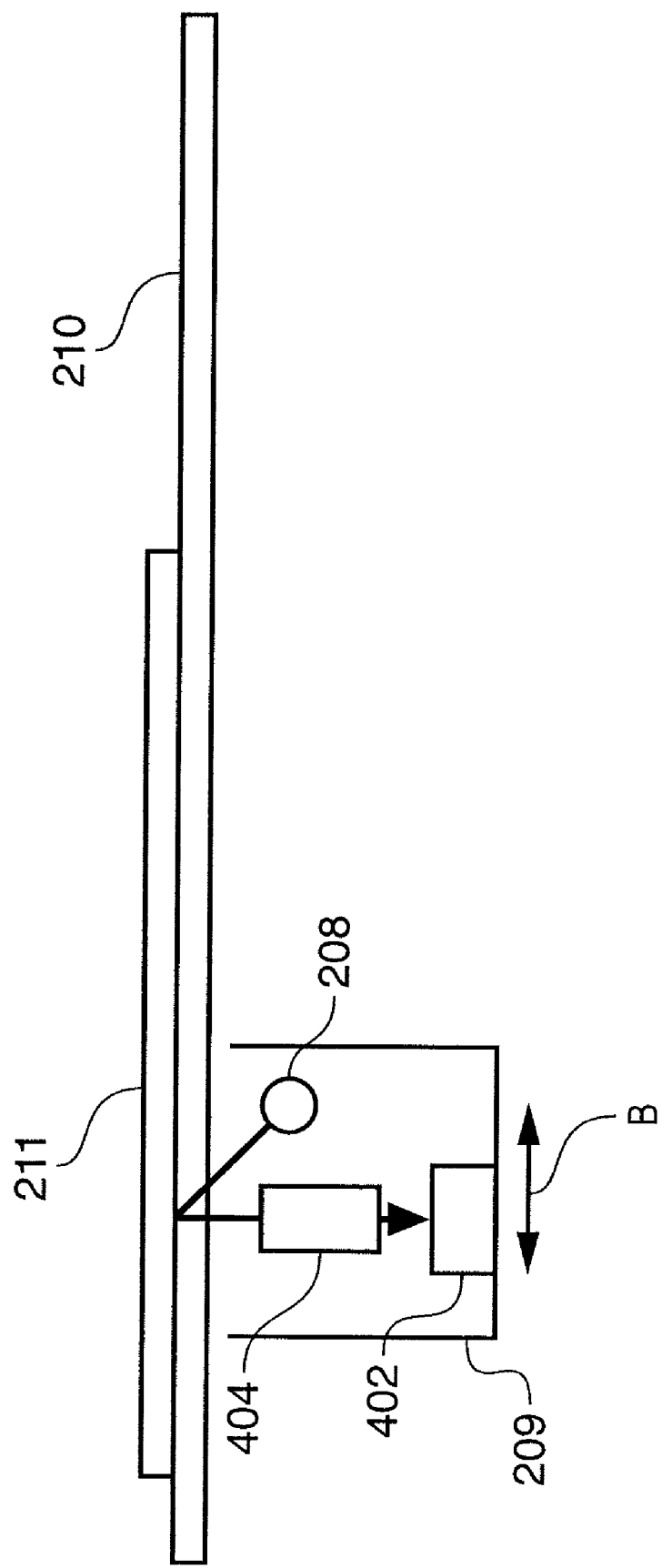

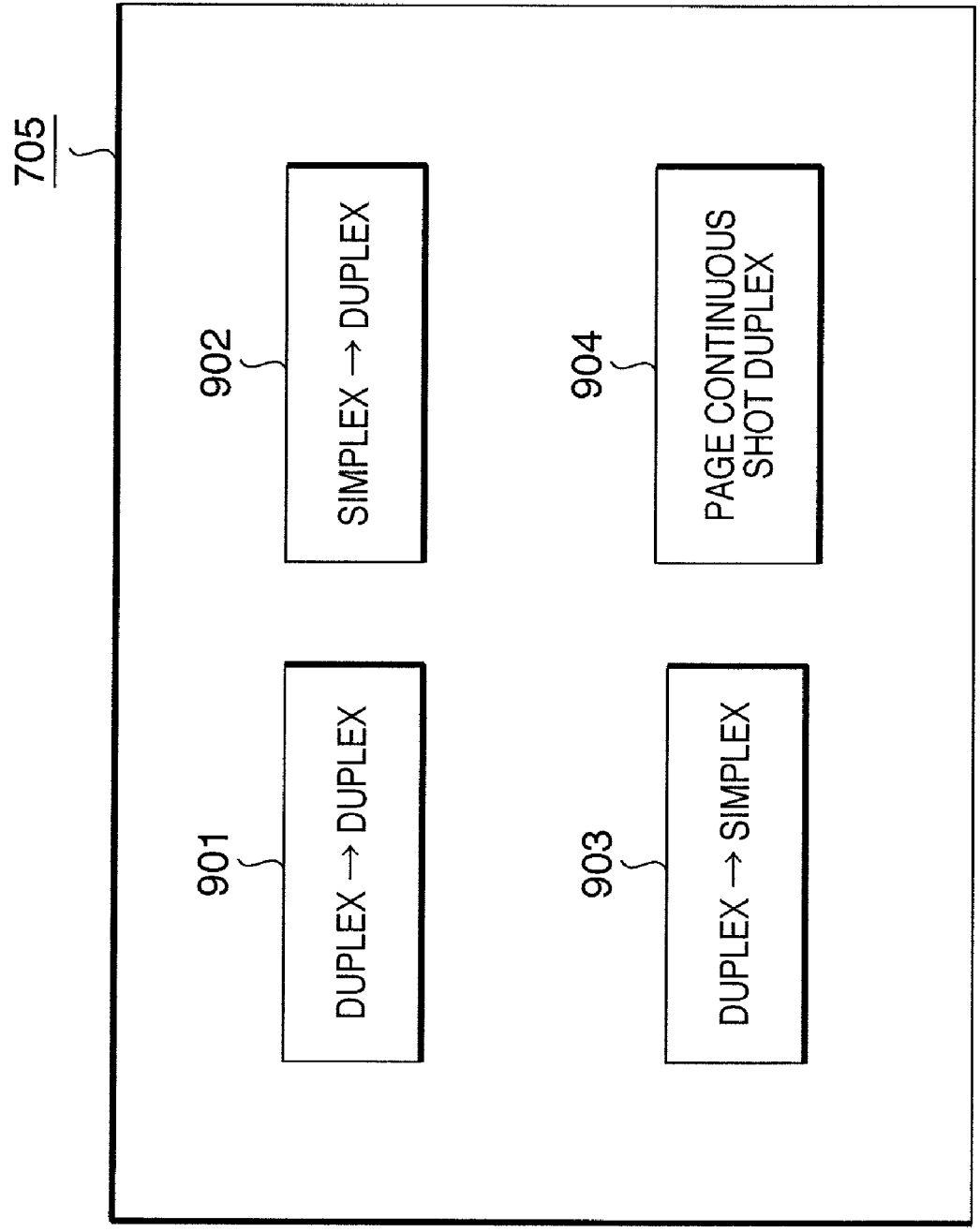

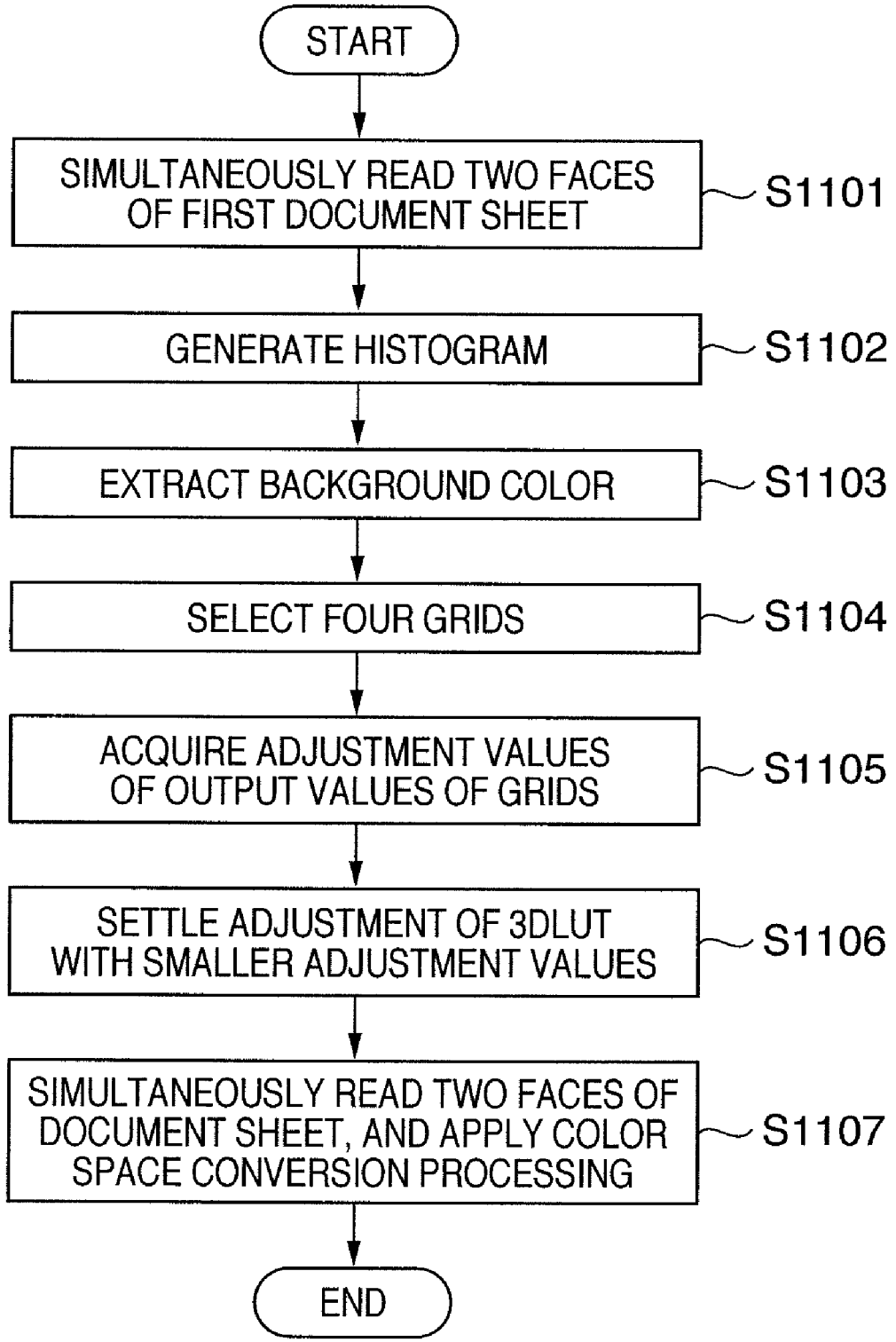

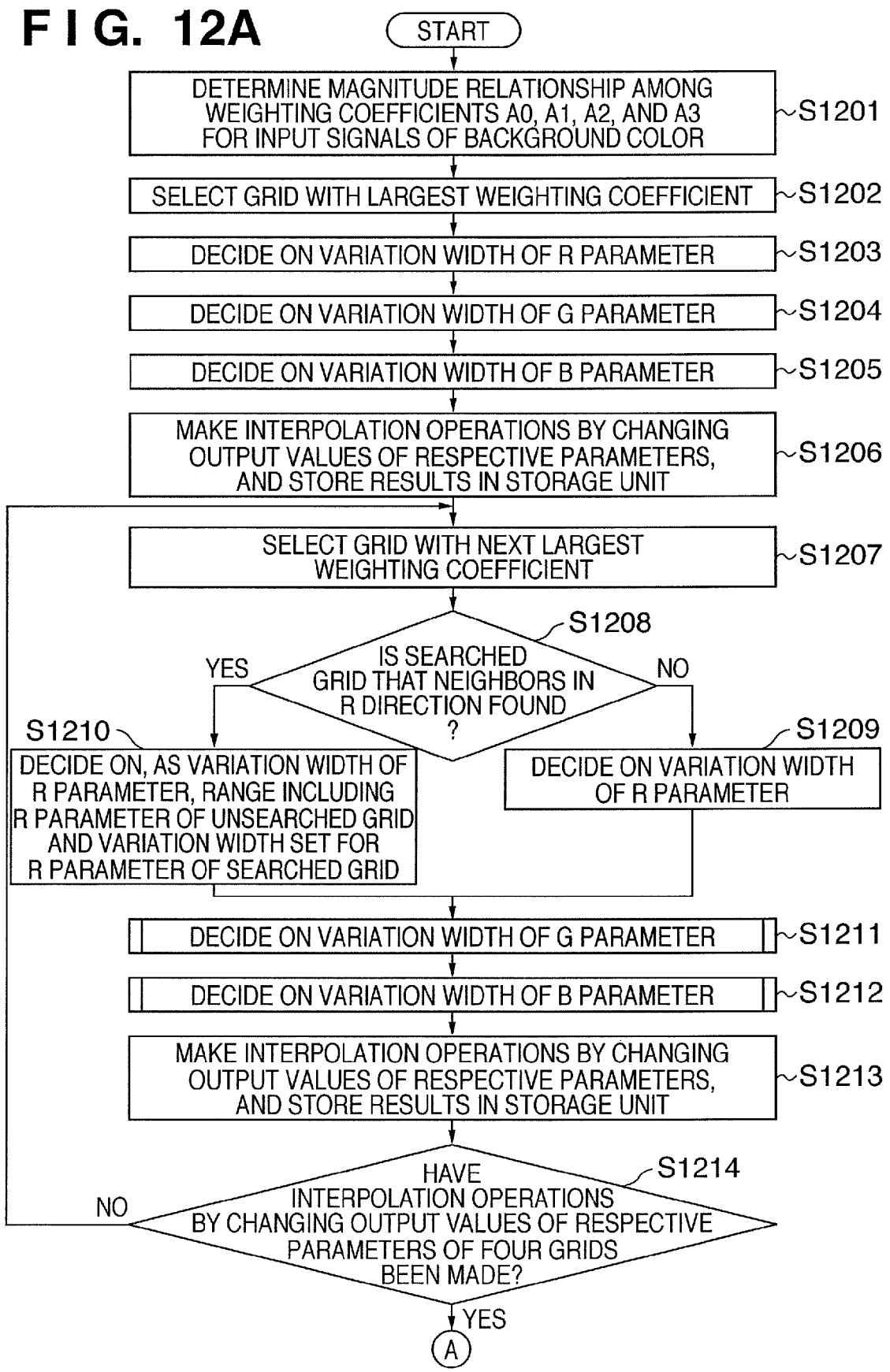

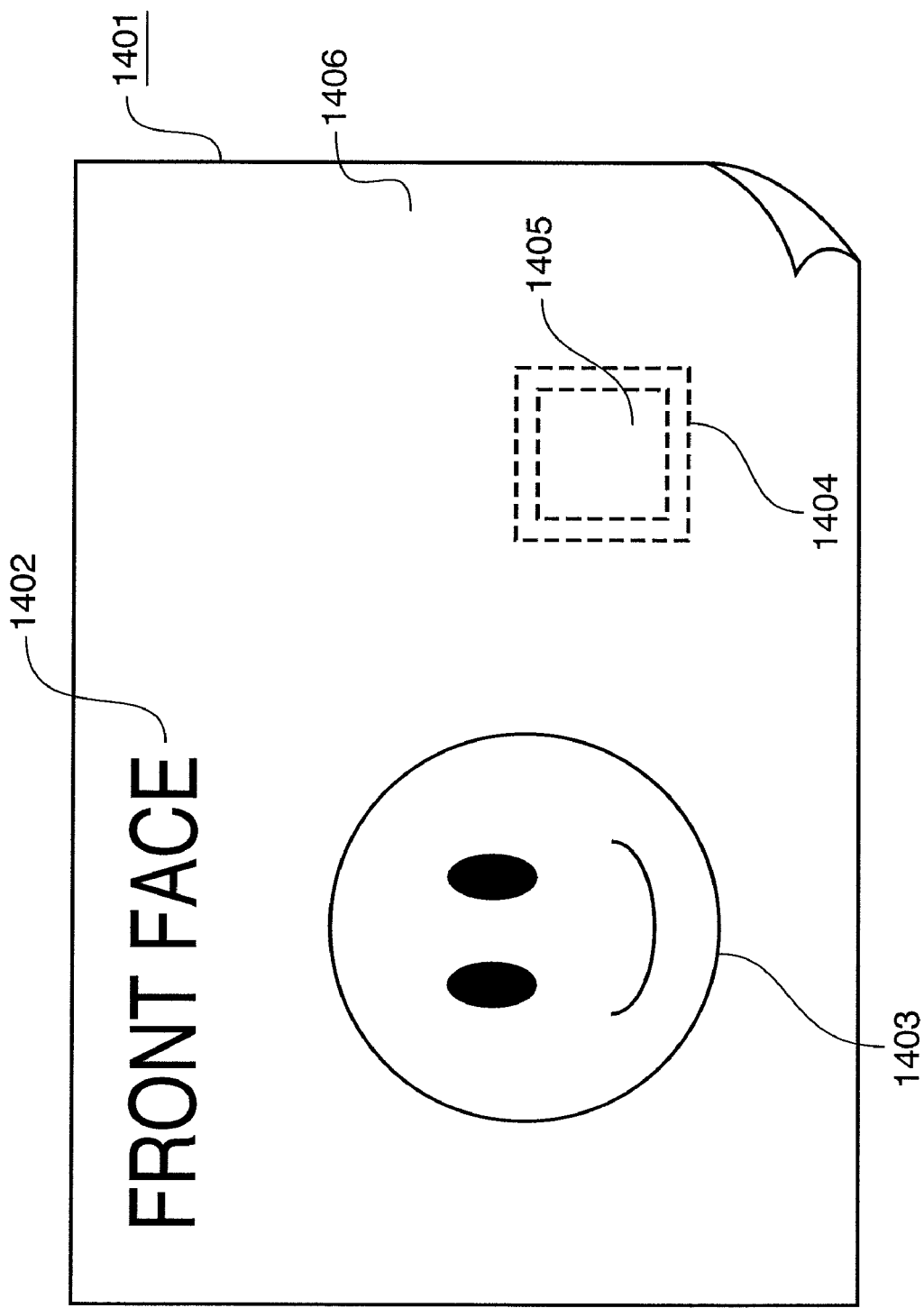

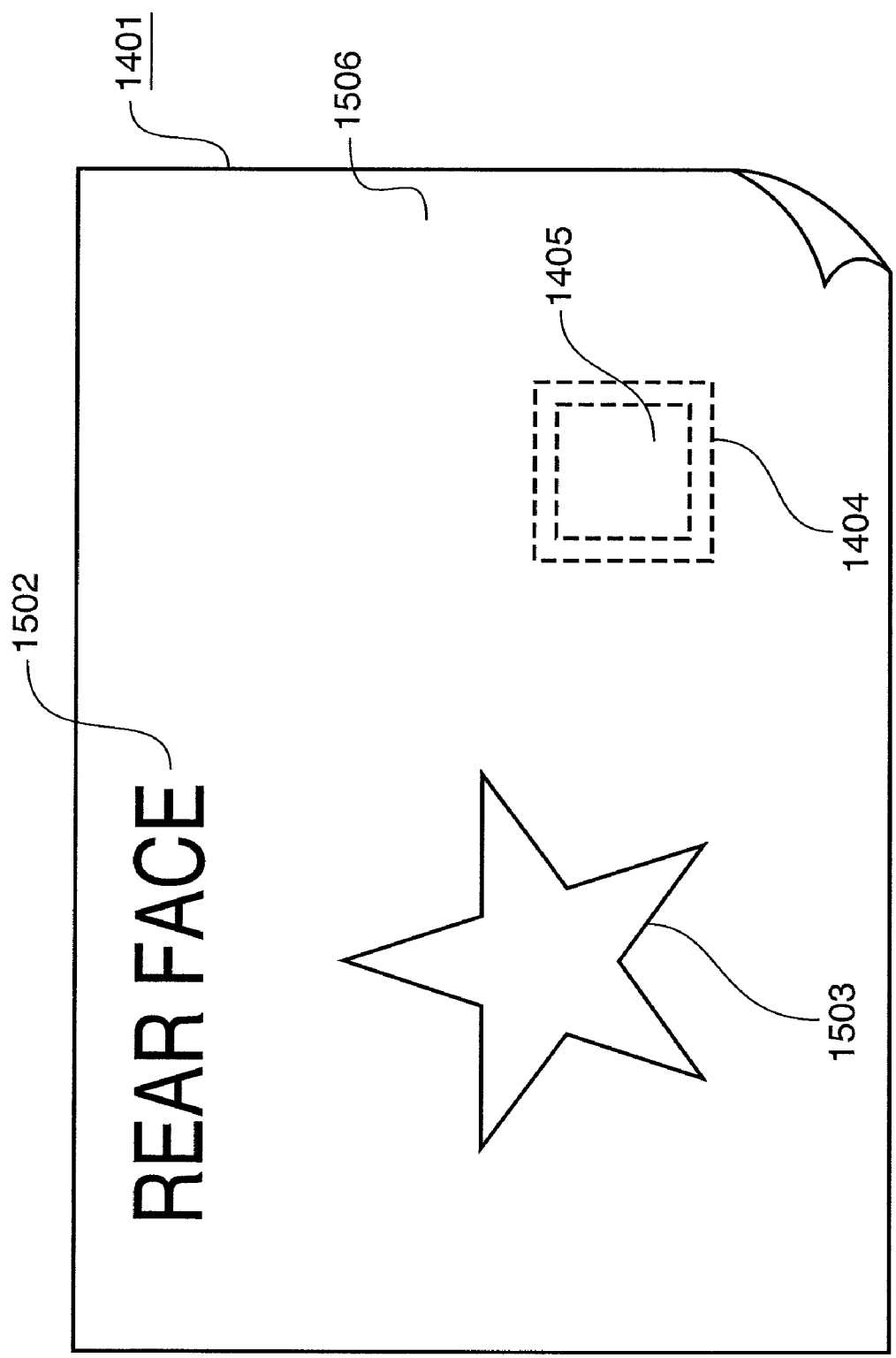

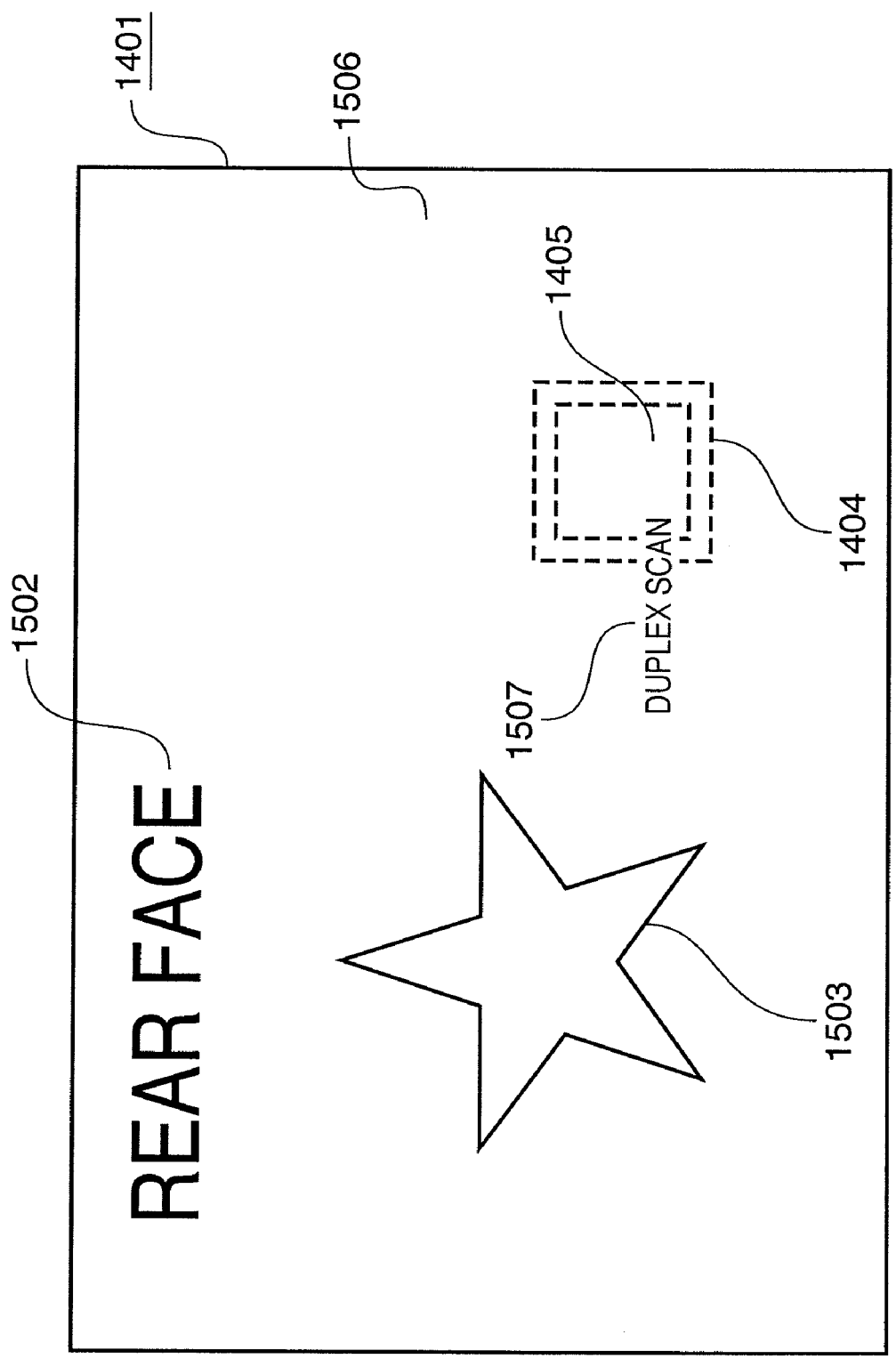

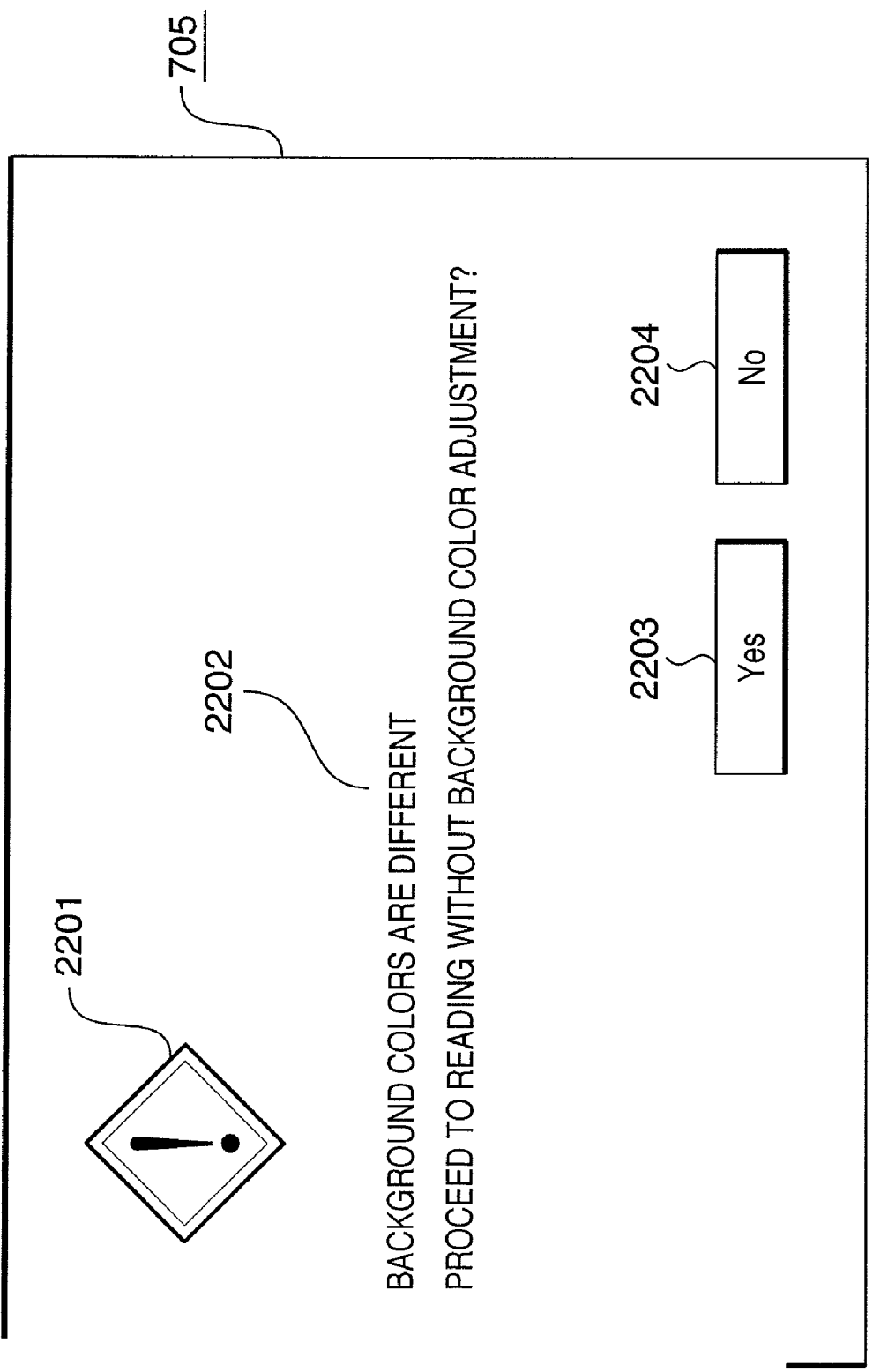

IMAGE READING APPARATUS AND IMAGE PROCESSING METHOD

BACKGROUND OF THE INVENTION

1. Field of the Invention

The present invention relates to image processing for reading images of both sides of a document sheet.

2. Description of the Related Art

As a means for digitally reading an image printed on a document, an image reader mounted on a copying machine, FAX apparatus, scanner, and the like is known. Also, an automatic both-sided reader (automatic duplex reader) which reads images printed on both front and rear faces of a document sheet (to be referred to as "images of both sides" hereinafter) by reversing the front and rear faces of the document sheet by a document reversing unit without the intervention of the user is known.

[Document Reader of Automatic Both-Sided Reader]

FIG. 1 is a schematic sectional view showing the arrangement of a document reader 201.

Pickup rollers 203 pick up document sheets 211 stacked on a document table 202 one by one, and feed them into a reading path. A picked-up document sheet 211 is conveyed in a direction of path 1 formed by rollers 205 shown in FIG. 1 via conveyance rollers 204. The document sheet 211 that has reached a reading position via path 1 is irradiated with light coming from a light source 208 arranged in a reading unit 209 via a platen glass 210, and light reflected by the document sheet 211 enters the reading unit 209.

The reading unit 209 comprises a photoelectric conversion element, and outputs an electrical signal according to the intensity of incoming light. This electrical signal is converted into a digital signal by an analog-to-digital (A/D) converter (not shown), thus obtaining digital image data representing a document image. In this manner, the reading unit 209 reads an image (to be referred to as "front image" hereinafter) printed on the front face of the document sheet 211, which passes through the reading position via path 1. Note that the light source 208 has a spectral distribution nearly equal to the range of visible wavelengths. The intensity of light that enters the reading unit 209 depends on the spectral reflectance distribution of an image printed on the document sheet 211.

When the leading end of the document sheet 211 has reached reverse conveyance/discharge rollers 206, the document sheet is discharged from the document reader 201 up to its trailing end. After that, when the reverse conveyance/discharge rollers 206 rotate in the reverse direction, the document sheet 211 is fed again into the document reader 201, and is guided by a guide 207 into a direction of path 2 formed by the rollers 205.

The document sheet 211 that has passed through path 2 is conveyed by the conveyance rollers 204 to the reading position via path 1 again. Then, the reading unit 209 reads an image (to be referred to as "backside image" hereinafter) printed on the rear face of the document sheet 211. After that, the document sheet 211 is discharged outside the document reader 201 by the reverse conveyance/discharge rollers 206.

The document reader 201 repeats the aforementioned operation to sequentially read images of both sides of a plurality of document sheets stacked on the document table 202.

A merit obtained upon reading images of both sides of a document sheet by the automatic both-sided reader having the document reader 201 shown in FIG. 1 is to be able to automatically read images of both sides without the intervention of the user. Furthermore, since images of both sides are read using the single light source and single reading unit, a reading optical system has a single arrangement, and the geometric and color characteristics of the reading results of the images of both sides match.

On the other hand, since the document sheet is conveyed inside the document reader 201 twice, that is, at the time of reading the front image and at the time of reading the backside image, it takes a lot of time to read images, and the document conveyance arrangement is complicated, resulting in a high probability of occurrence of a paper jam. These are the demerits of the automatic both-sided reader.

[Document Reader of Simultaneous Both-Sided Reader]

A simultaneous both-sided reader (simultaneous duplex reader) that simultaneously reads images of both sides by conveying a document sheet only once is available.

FIG. 2 is a schematic sectional view of a document reader 301 of the simultaneous both-sided reader.

Pickup rollers 203 pick up document sheets 211 stacked on a document table 202 one by one, and feed them into a reading path. A picked-up document sheet 211 is conveyed in a direction of path 3 formed by rollers 205 shown in FIG. 2 via conveyance rollers 204. The document sheet 211 that has reached a first reading position via path 3 is irradiated with light coming from a light source 208 arranged in a reading unit 209 via a platen glass 210, and light reflected by the document sheet 211 enters the reading unit 209. The reading unit 209 reads the front image of the document sheet 211 that passes through the first reading position.

After that, the document sheet 211 reaches a second reading position, and is irradiated with light coming from a light source 303 arranged in a reading unit 304. Light reflected by the document sheet 211 enters the reading unit 304. The reading unit 304 reads the backside image of the document sheet 211 that passes through the second reading position. After that, the document sheet 211 is discharged outside the document reader 301 by discharge rollers 302.

The document reader 301 repeats the aforementioned operation to read images of both sides of a plurality of document sheets stacked on the document table 202 by conveying each document sheet only once.

A merit obtained upon reading images of both sides of a document sheet by the simultaneous both-sided reader having the document reader 301 shown in FIG. 2 is not only to be able to automatically read images of both sides without the intervention of the user. Since this reader reads images of both sides of a document sheet by conveying the document sheet only once, the image reading time can be shortened to improve the performance of the image reader. Also, since only one conveyance path is used, the probability of occurrence of a paper jam can be reduced.

In the following description, a combination of the light source 208 and reading unit 209 will be referred to as reading device A, and a combination of the light source 303 and reading unit 304 will be referred to as reading device B.

Arrangement of Reading Device A

As shown in FIG. 2, reading device A is laid out below the platen glass 210, and when the document sheet 211 is placed on the platen glass 210, reading device A is moved in the sub-scan direction to read an image of one face of the document sheet 211. Note that the reading method of moving the reading device will be referred to as "reading through platen" hereinafter.

Since reading device A used in reading through platen has sufficient margins for its layout space and scan space, it can use either a reduction optical system shown in FIG. 3A or a non-scaled optical system shown in FIG. 3B.

Reading of Image by Reduction Optical System

Image reading of the reduction optical system shown in FIG. 3A is as follows.

The reading unit 209 includes the light source 208 and a reflecting mirror 401, which are mechanically fixed, and the reading unit 209 itself moves in a direction of arrow A shown in FIG. 3A. The reading unit 209, light source 208, and reflecting mirror 401 have a width equal to or larger than the total width of the document sheet 211 to be read. Note that the width corresponds to the depth direction in FIG. 3A.

Light L emitted by the light source 208 illuminates the document sheet 211 via the platen glass 210. The light L reflected by the document sheet 211 is reflected by the reflecting mirror 401, and its optical path is changed. The light L is reduced in scale by a reduction lens (f-θ lens) 403, and enters a photoelectric conversion element 402. Note that the reduction lens 403 reduces, in scale, the light L which has a width equal to or larger than the document sheet 211 in accordance with the width of the photoelectric conversion element 402.

The photoelectric conversion element 402 comprises, for example, a charge coupled device (CCD), and is a semiconductor device which converts incoming light into an electrical signal. Normally, the width of the photoelectric conversion element 402 is narrower than that of the document sheet 211. Therefore, the reduction scale of the reduction lens 402 is decided based on the ratio of the width of the document sheet 211 to that of the photoelectric conversion element 402.

The reading unit 209 and reduction lens 403 of the reduction optical system synchronously move in the direction of arrow A to scan the document sheet 211, thus reading the image on the document sheet 211.

Reading of Image by Non-Scaled Optical System

Image reading of the non-scaled optical system shown in FIG. 3B is as follows.

The reading unit 209 which comprises a contact image sensor (CIS) unit includes the light source 208, a non-scaled lens 204, and the photoelectric conversion element 402, which are mechanically fixed in position, and the reading unit 209 itself moves in a direction of arrow B shown in FIG. 3B. The reading unit 209, light source 208, non-scaled lens 404, and photoelectric conversion element 402 have a width equal to or larger than the total width of the document sheet 211 to be read.

Light L emitted by the light source 208 illuminates the document sheet 211 via the platen glass 210. The light L reflected by the document sheet 211 enters the photoelectric conversion element 402 via the non-scaled lens 404.

In this way, the reading unit 209 as the CIS unit moves in the direction of arrow B to scan the document sheet 211, thus reading the image on the document sheet 211.

Light Source and Photoelectric Conversion Element

In general, upon reading a color image, as the light source 208, a light source that includes the visible wavelength range is used. Also, as the photoelectric conversion element 402, a device which has color separation filters of red (R), green (G), and blue (B) as primary colors, and three arrays of photoelectric conversion element groups corresponding to the filters are used.

Also, a method of using light sources which can respectively emit R, G, and B wavelengths as the light source 208 and a device having a single photoelectric conversion element group as the photoelectric conversion element 402 may be used. That is, in this method, upon scanning the document sheet 211, light sources R, S, and B are turned on in turn, reflected light of each light source is read by the single photoelectric conversion element 402, and R, G, and B signals obtained for the respective light sources are combined to obtain color image data.

Arrangement of Reading Device B

As can be seen from the layout shown in FIG. 2, reading device B hardly adopts a reduction optical system having a long optical distance, and normally adopts a non-scaled optical system.

[Different Reading Characteristics Due to Different Optical Systems]

In this way, when reading device A adopts a reduction optical system and reading device B adopts a non-scaled optical system, the front and backside images have different reading characteristics and particularly different color reproducibilities. Even when both reading devices A and B adopt identical optical systems and identical devices, they may have different reading characteristics and particularly different color reproducibilities due to factors such as the degree of float of a document sheet at the reading positions, the degree of incidence of external light, and the like.

The simultaneous both-sided reader is required to have equal color reproducibilities of images read from the two faces of a document sheet. However, in practice, identical pictures/hues on the two faces of a document sheet may be only backgrounds of a presentation reference, brochure, or the like, and respective pages have different detailed contents even on the presentation reference, brochure, or the like. In other words, it is important to have equal color reproducibilities of images read from the two faces of each document sheet in terms of identical backgrounds over a plurality of pages.

Japanese Patent Laid-Open No. 2005-020224 discloses the following method. That is, characteristic parameters R of reference image data which is prepared in advance are compared with characteristic parameters F of read image data of a front image (to be referred to as "front image data" hereinafter) to correct the characteristic parameters F. After that, the backside image is read, and corrected characteristic parameters F' of the front image data are compared with characteristic parameters Q of read image data of a backside image (to be referred to as "backside image data" hereinafter) to correct the characteristic parameters Q. As described in this reference, this method reduces the characteristic difference between the front and backside image data.

FIG. 4 shows the sequence of image processing which is assumed to correct the color reproducibility difference in the simultaneous both-sided reader that suffers different color reproducibilities of images of both sides.

A reading unit 501 as reading device A reads the front image of the document sheet 211 to generate Ra, Ga, and Ba signals. Note that the Ra, Ga, and Ba signals are signals which have characteristics depending on reading device A and do not have any significance as a color system specified by Commission Internationale de l'Éclairage (CIE). A color space converter 503 converts the Ra, Ga, and Ba signals into Ra', Ga', and Ba' signals of a color space related to the CIE calorimetric system (e.g., L*a*b*), thus obtaining front image data 505.

A reading unit 502 as reading device B reads the backside image of the identical document sheet 211 to generate Rb, Gb, and Bb signals. These Rb, Gb, and Bb signals also have characteristics depending on reading device B. A color space converter 504 converts the Rb, Gb, and Bb signals into Rb', Gb', and Bb' signals of a color space related to the CIE colorimetric system, thus obtaining backside image data 506.

As the color space converters 503 and 504, a three-dimensional lookup table (3DLUT) which inputs and outputs three signals, or 3×3 or 3×9 matrix arithmetic processing can be applied. Also, since the color space conversion is known to those who are skilled in the art, a detailed description thereof will not be given.

An image which has an 8-bit depth per color of RSB can express about 16 million colors. The 3DLUT is normally configured to have color patches fewer than 16 million patches as samples and to minimize a color difference ΔEave of their averages. Therefore, upon using the 3DLUT or matrix arithmetic processing, it is difficult to attain a color difference ΔE=0 for all colors. That is, the 3DLUT inevitably requires interpolations unless a table having about 16 million entries is prepared, and quantization and interpolation errors corresponding to the table size occur. Of course, the data size of the table having about 16 million entries is impractically as large as 500 MB. On the other hand, when using the matrix arithmetic processing, since RGB and L*a*b* have the nonlinear relationship, it is impossible to attain the color difference ΔE=0.

Since the invention described in Japanese Patent Laid-Open No. 2005-020224 aims at reducing the color reproducibility difference between the images read from the two faces of the document sheet, it is difficult to adjust the color reproducibilities of identical background images read from the two faces of each document sheet over a large number of pages. Also, the reference image data must be prepared in advance, and image correction is done according to the reference image data. Therefore, it is difficult to attain dynamic image correction according to documents.

SUMMARY OF THE INVENTION

In one aspect, an image reading apparatus for reading images of both sides of a document sheet, comprises: a first reader, arranged to read a front image of the document sheet; a second reader, arranged to read a backside image of the document sheet; an extractor, arranged to extract a first background color of the image read by the first reader, and a second background color of the image read by the second reader; a first color processor, arranged to apply color processing to the image read by the first reader;

a second color processor, arranged to apply color processing to the image read by the second reader; and an adjustor, arranged to adjust color processing parameters used by the first or second color processor so as to make an output of the first color processor for the first background color be approximately equal to an output of the second color processor for the second background color.

According to the aspect, upon reading images of both sides of a document sheet, the color reproducibilities of identical background images read from the two faces of each document sheet over a large number of pages can be adjusted.

Further features of the present invention will become apparent from the following description of exemplary embodiments with reference to the attached drawings.

BRIEF DESCRIPTION OF THE DRAWINGS

FIG. 3B is a view for explaining image reading of a non-scaled optical system;

FIG. 10 shows a display window of scan modes of a copying machine;

FIG. 11 is a flowchart showing the processing for reading each document sheet, the two faces of which have identical backgrounds, over a large number of pages using the simultaneous both-sided reader, and adjusting the color reproducibilities of the background images to match each other or to be possibly equal to each other;

FIGS. 12A and 12B are flowcharts showing the processing for adjusting the output values of grids;

FIGS. 15A and 15B show example of front and backside images of a document sheet;

FIG. 19A is a view for explaining a problem of region designation;

FIG. 22 shows an example of a warning dialog.

DESCRIPTION OF THE EMBODIMENTS

Image processing according to the embodiments of the present invention will be described in detail hereinafter with reference to the accompanying drawings. Note that a simultaneous both-sided reader equipped in a copying machine will be exemplified for the sake of convenience, but it may be equipped in a FAX apparatus or scanner. Also, an image signal read by the simultaneous both-sided reader has an 8-bit depth per color of RGB for the sake of convenience.

First Embodiment

[Arrangement]

Figure 1:
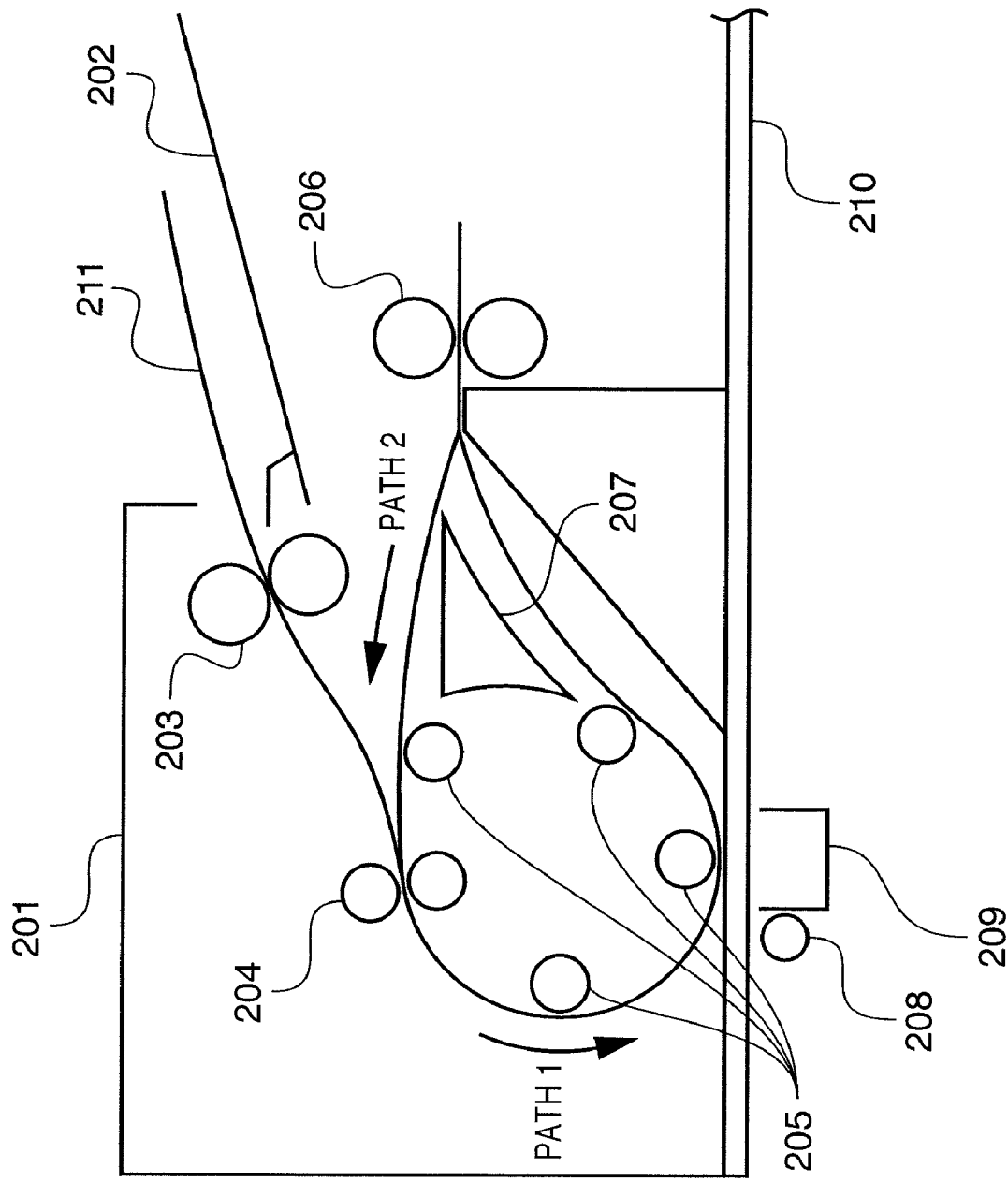
FIG. 1 is a schematic sectional view showing the arrangement of a document reader.
Figure 2:
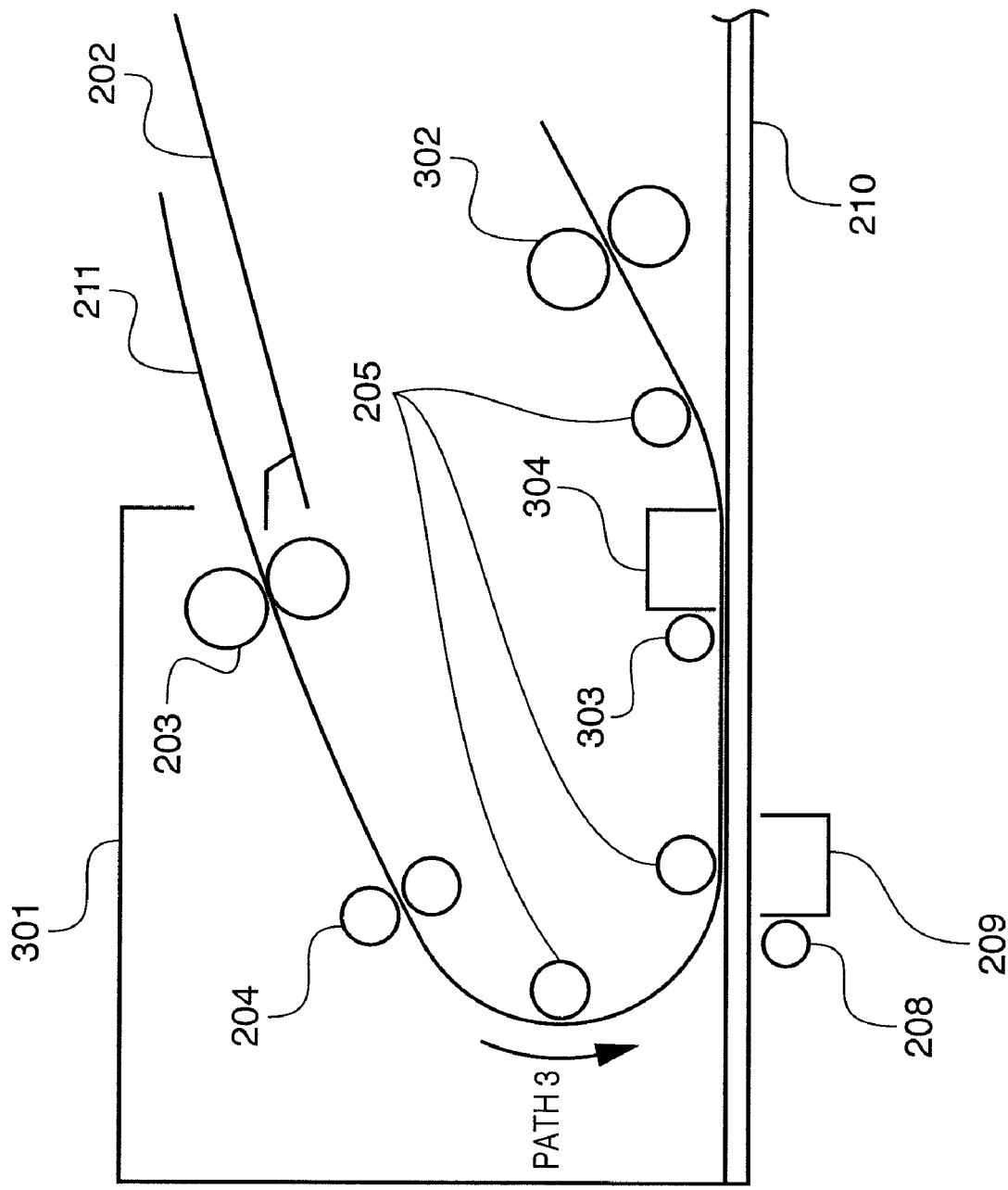
FIG. 2 is a schematic sectional view showing the arrangement of a document reader of a simultaneous both-sided reader.
Figure 3A:
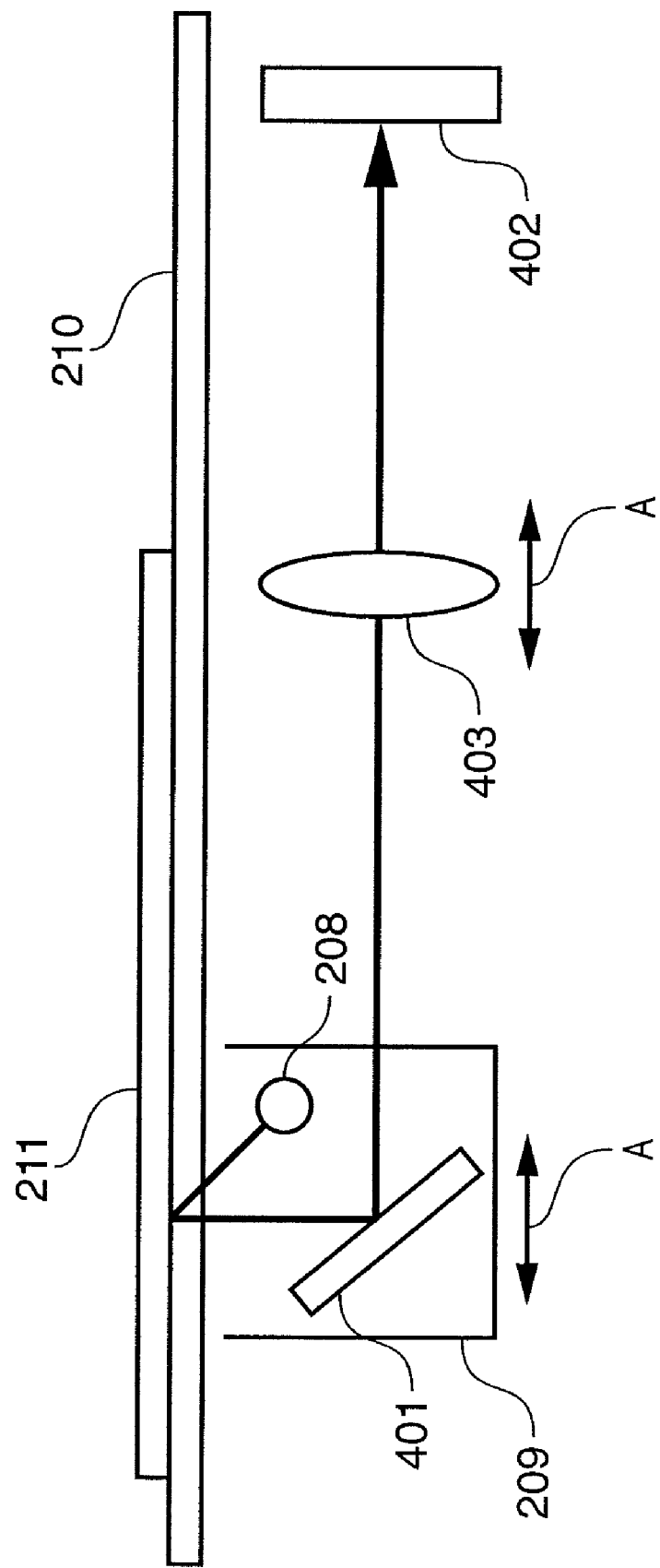
FIG. 3A is a view for explaining image reading of a reduction optical system.
Figure 4:
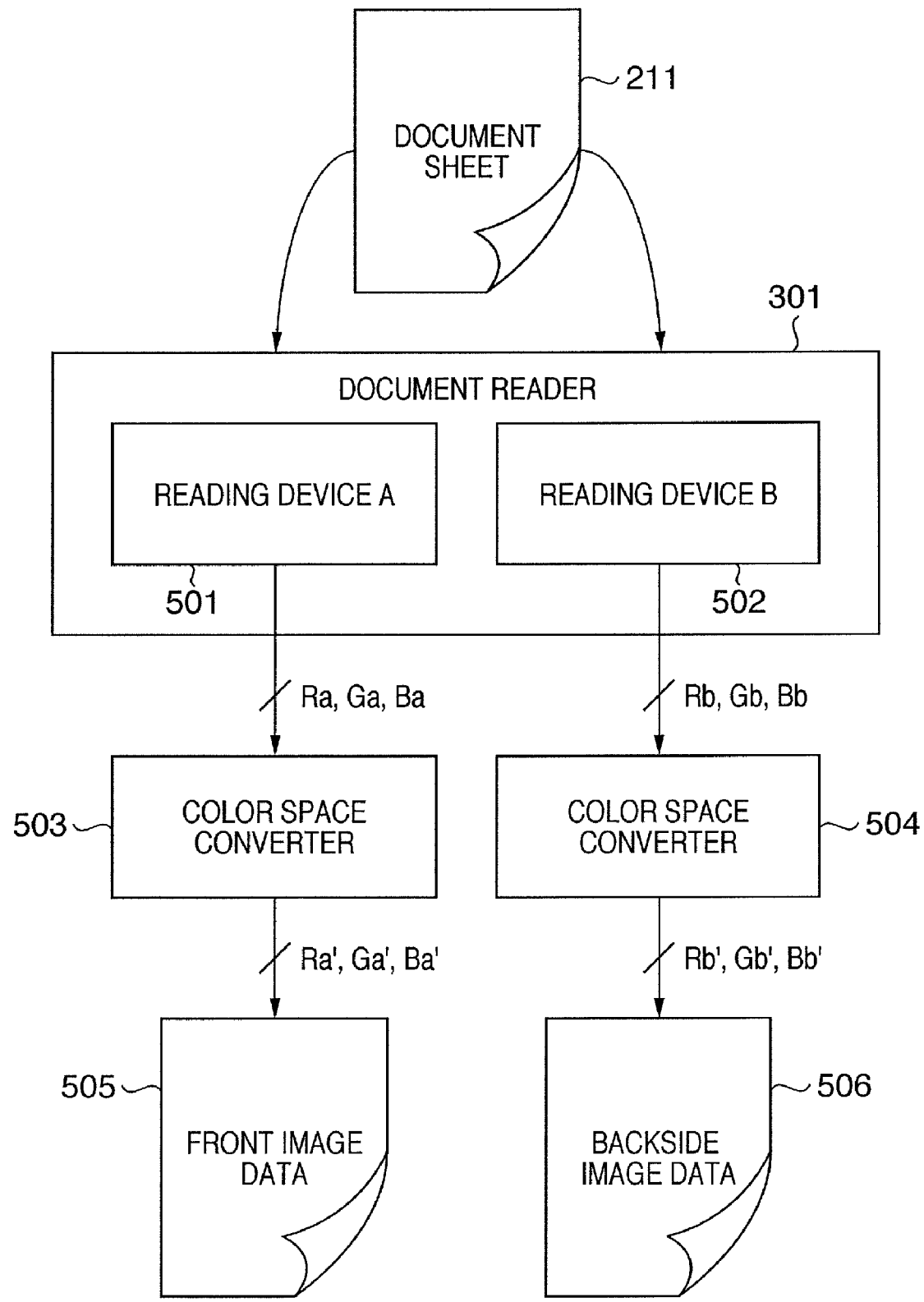
FIG. 4 is a diagram showing the sequence of image processing which is assumed to correct the color reproducibility difference in the simultaneous both-sided reader that suffers different color reproducibilities of images of both sides.
Figure 5:
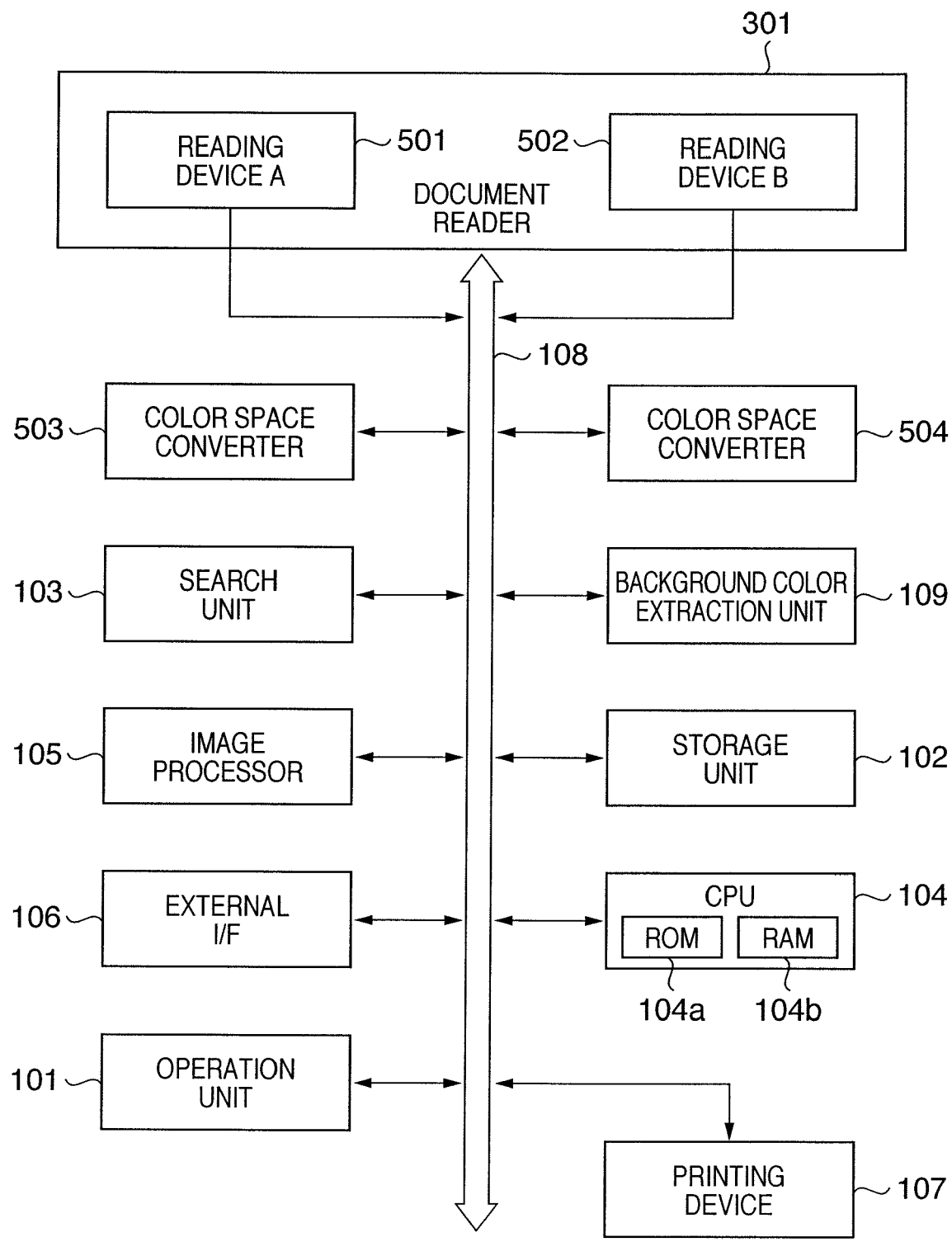
FIG. 5 is a block diagram showing the arrangement of a simultaneous both-sided reader according to the first embodiment.

FIG. 5 is a block diagram showing the arrangement of a simultaneous both-sided reader according to the first embodiment. A mechanical structure of a document reader 301 is substantially the same as that shown in FIG. 2, and a repetitive description thereof will be avoided.

A CPU 104 is, for example, a one-chip microprocessor, and controls respective components via a system bus 108 in accordance with control programs stored in an internal read-only memory (ROM) 104a using an internal random access memory (RAM) 104b as a work memory. Also, the CPU 104 controls respective components in accordance with user's instructions input from an operation unit 101. The operation unit 101 corresponds to a control panel of the copying machine which is equipped with the simultaneous both-sided reader.

A color space converter 503 comprises a 3DLUT, and applies color processing to image data output from a reading unit 501 which reads the front image of a document sheet. A color space converter 504 comprises a 3DLUT, and applies color processing to image data output from a reading unit 502 which reads the backside image of a document sheet.

As will be described in detail later, a search unit 103 searches the 3DLUT for correction values. A background color extraction unit 109 extracts image data indicating a background of a document. A storage unit 102 stores images whose image processing is underway, various processing parameters, and various programs including control programs to be executed by the CPU 104 and the like.

An external interface (I/F) 106 is an interface used to connect this apparatus to an external device or external line. A printing device 107 is a printer which prints an image on a print sheet.

[Color Space Converter]

Figure 6:
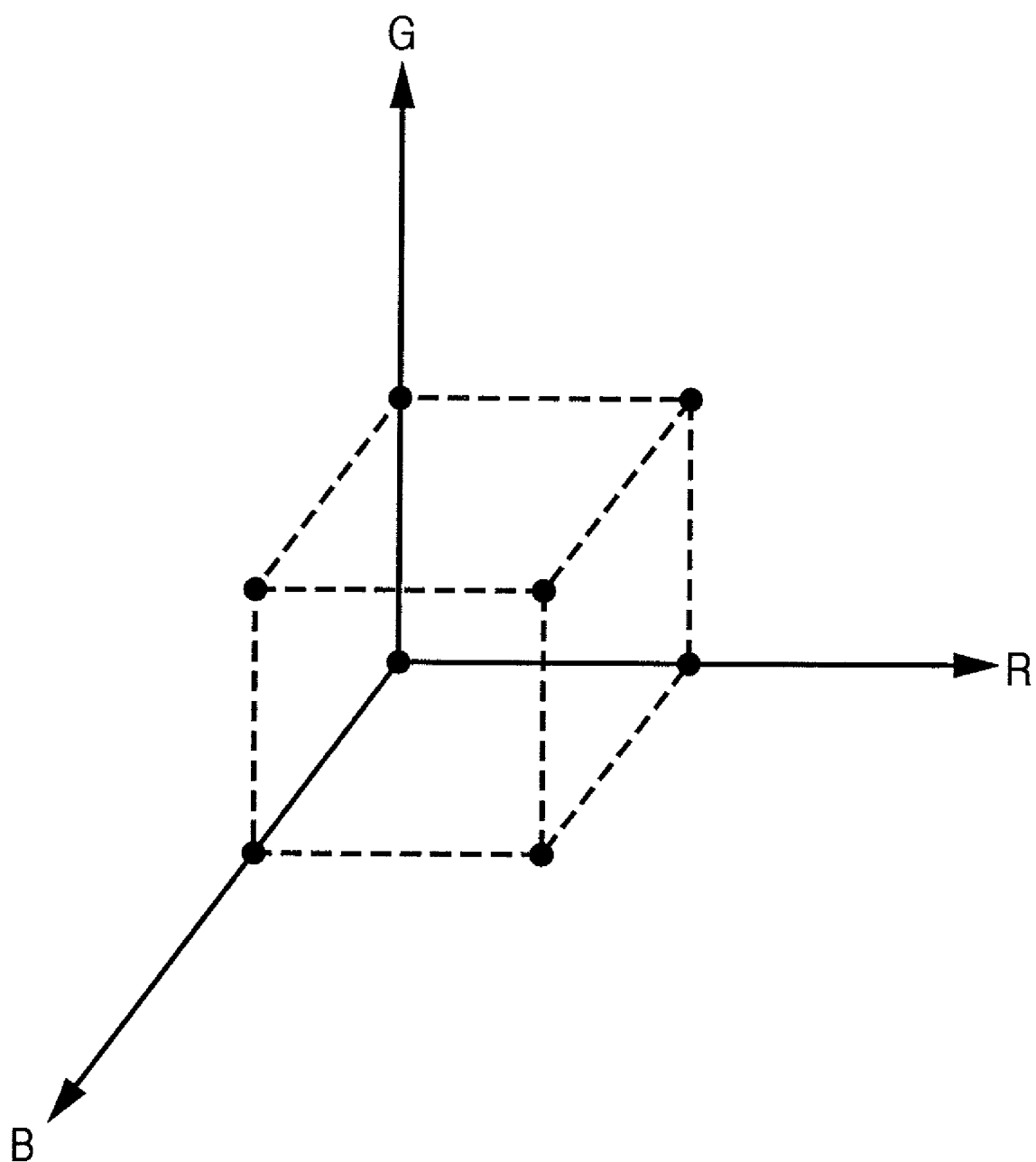
FIG. 6 conceptually shows a 3DLUT of a color space converter.

FIG. 6 conceptually shows the 3DLUT of the color space converters 503 and 504. Each 3DLUT has orthogonal axes corresponding to values 0 to 255 in three, R, G, and B directions, in correspondence with RGB data output from the reading unit 501 or 502. Entry points of the 3DLUT are allocated for values which are discretely set on the respective orthogonal axes, and output data R'G'B' of the 3DLUT are set at the respective entry points. Note that this entry point will be referred to as a grid hereinafter.

When RGB data are input to the 3DLUT, the vertices (four grids) of a triangular pyramid that encloses their coordinates (R, G, B) are decided, and output data R'G'B' are calculated by linear interpolation (tetrahedron interpolation) based on the distances between the grids and the coordinate values of the input data.

Figure 7:
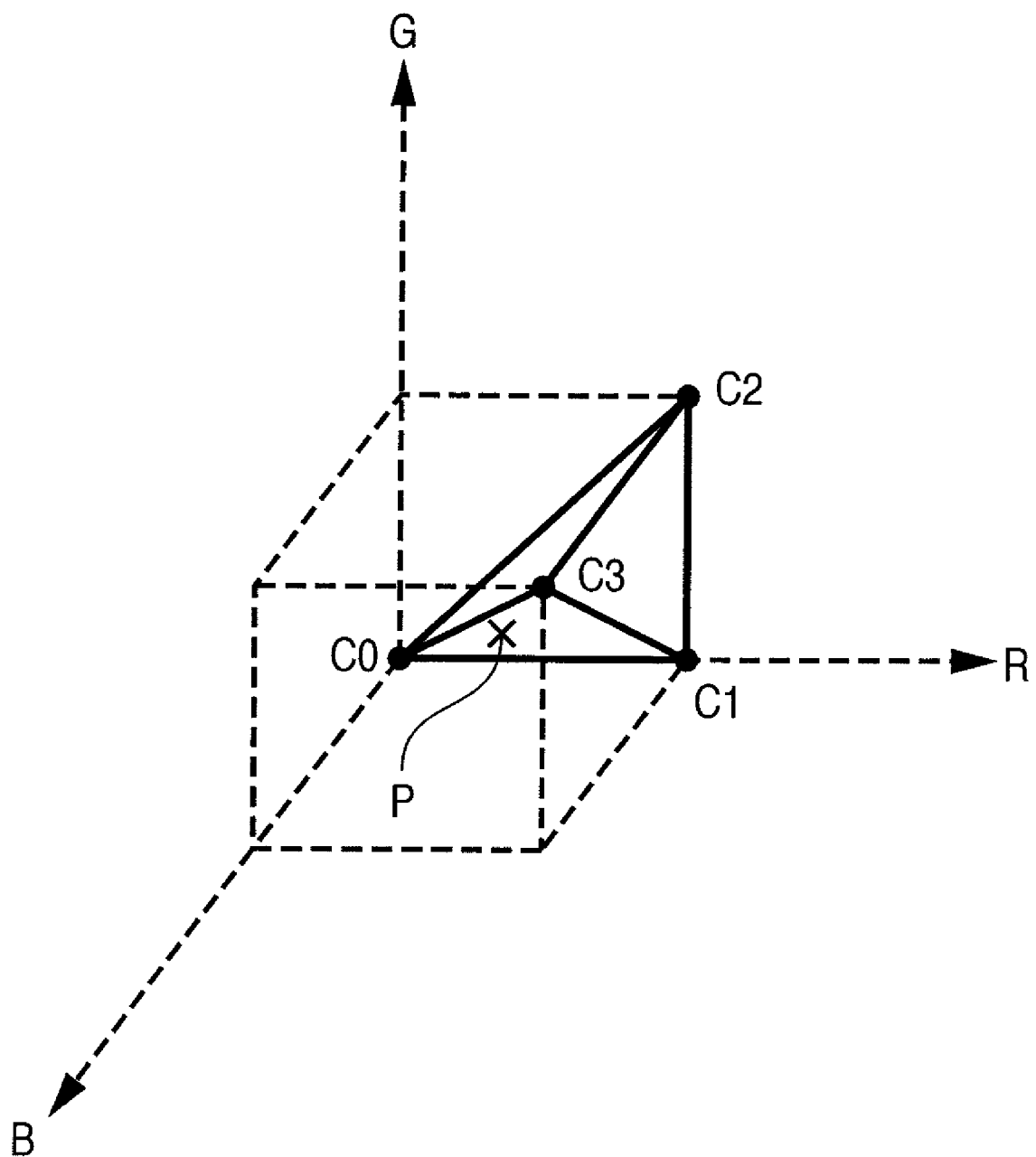
FIG. 7 shows an example of four grids that enclose input data.

FIG. 7 shows an example of four grids that enclose input data P. Output values as color processing parameters which are stored in respective grids C0, C1, C2, and C3 are:

$$C0:(R_{C0}, G_{C0}, B_{C0})$$

$$C1:(R_{C1}, G_{C1}, B_{C1})$$

$$C2:(R_{C2}, G_{C2}, B_{C2})$$

$$C3:(R_{C3}, G_{C3}, B_{C3}) \quad (1)$$

Weighting coefficients A0, A1, A2, and A3 for the respective grids are calculated based on the distances between the grids and the coordinate values of the input data RGB. Let N be a grid interval. Then, the output data R'G'B' of the 3DLUT for the input data RGB are respectively given by:

$$R' = (A0 \times R_{C0} + A1 \times R_{C1} + A2 \times R_{C2} + A3 \times R_{C3})/N$$

$$G' = (A0 \times G_{C0} + A1 \times G_{C1} + A2 \times G_{C2} + A3 \times G_{C3})/N$$

$$B' = (A0 \times B_{C0} + A1 \times B_{C1} + A2 \times B_{C2} + A3 \times B_{C3})/N \quad (2)$$

With such processing of the color space converters 503 and 504, image data read by the reading unit 501 are converted into data OUTa(Ra', Ga', Ba'), and image data read by the reading unit 502 are converted into data OUTb(Rb', Gb', Bb').

This embodiment has as its object to obtain OUTa=OUTb for identical backgrounds over a large number of pages. However, even for identical backgrounds, image data INa(Ra, Ga, Ba) read by the reading unit 501 are not equal to image data INb(Rb, Gb, Bb) read by the reading unit 502 (INa≠INb). In addition, the parameters of the 3DLUTs of the color space converters 503 and 504 are not equal to each other, and arithmetic errors of interpolation operations may occur. Therefore, it is difficult for all of about 16 million colors in case of 8 bits per color to attain OUTa=OUTb, and differences are generated in no small measure, resulting in OUTa≠OUTb.

[Background Color Extraction Unit]

The background color extraction unit 109 generates histograms of RGB data for all pages read by the reading units 501 and 502, and decides signal values indicating a background color based on the frequencies of occurrence of signal values of RGB channels. Note that the background color extraction unit 109 is configured to extract signal values indicating background colors of image data read by the reading units 501 and 502. Note that the histograms may be generated by accumulating signal values of all pixels for one page. However, by sampling pixels at predetermined intervals, the required memory size can be reduced accordingly, thus speeding up the background color extraction processing.

[Operation Unit]

Figure 8:
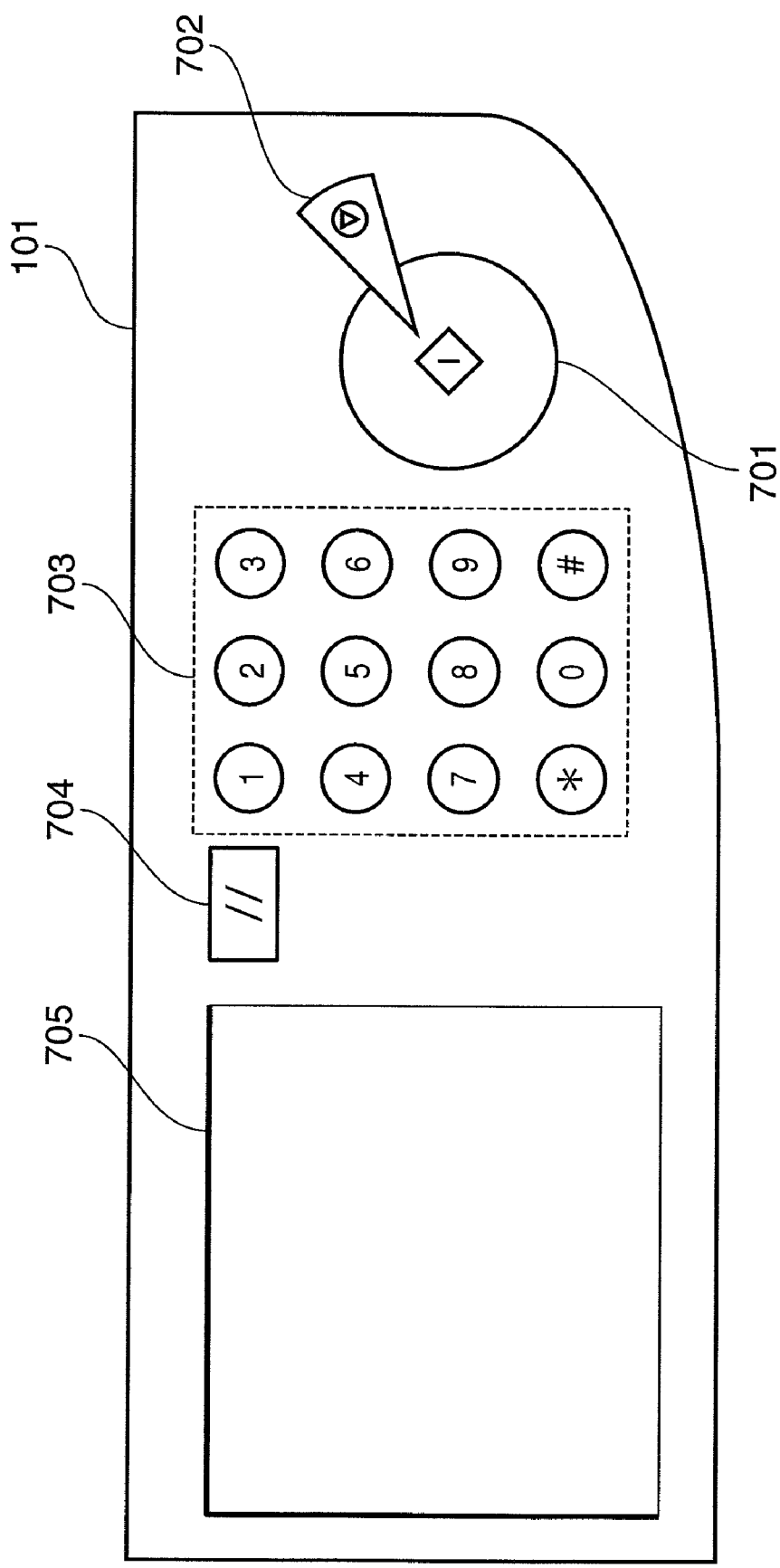
FIG. 8 is a view for explaining details of an operation unit.

FIG. 8 is a view for explaining details of the operation unit 101.

The operation unit 101 comprises a start key 701 which allows the user to input a start instruction of a job such as a copy job, scan job, and the like. Furthermore, the operation unit 101 comprises a stop key 702 used to cancel the job in execution, a numerical keypad 703 used to input a dial number or numerical value in a FAX mode, and a reset key 704 used to reset operation settings to default values. Furthermore, the operation unit 101 comprises a screen 705 which displays various kinds of setting information, and allows the user to select an operation mode and the like via a touch panel.

Figure 9:
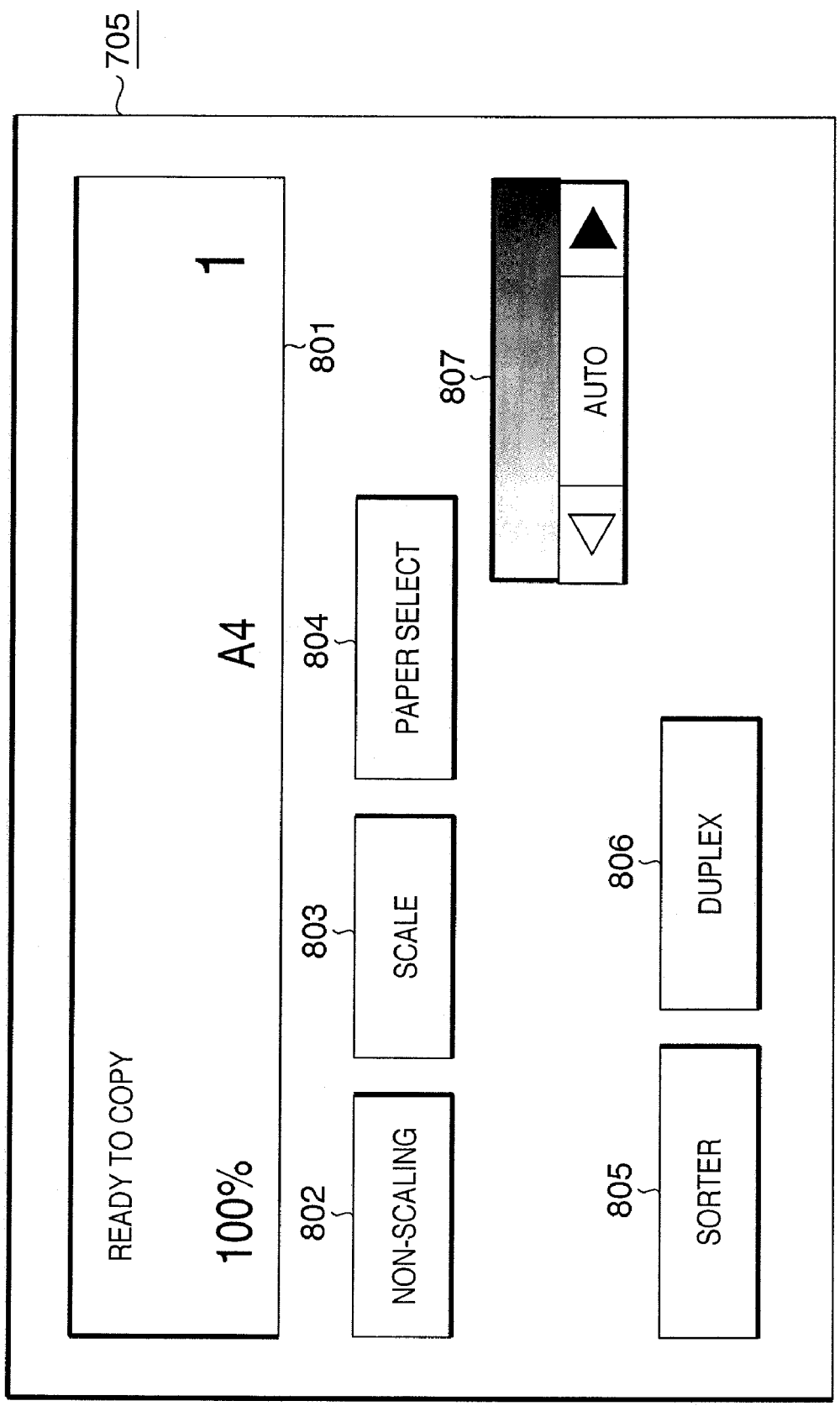
FIG. 9 shows a default window of a copy function displayed on a screen.

FIG. 9 shows a default window of a copy function displayed on the screen 705.

A status display area 801 displays a status indicating whether or not the apparatus is currently ready to accept a job, set copy scale, set print sheet size, copy count, and the like. Furthermore, the window of the copy function includes the following buttons and the like: an non-scaling button 802 used to set a copy scale=100%, a scale button 803 used to select a detailed scale setting mode, a print sheet select button 804 used to select a print sheet size setting mode, a sorter button 805 used to select a finishing (staple and sort) setting mode, a density setting button 807 used to set a copy density, and a duplex button 806 used to select a detailed both-sided (duplex) scan setting mode. Note that these buttons are implemented by the touch panel system, and when the user touches a desired button, a function set for that button is executed. In the following description, however, an expression "press a button" will be used.

Upon making a simultaneous both-sided (duplex) scan, the user presses the duplex button 806 after he or she sets a document on the document table 202. With this operation, the display on the screen 705 transits to a window shown in FIG. 10.

FIG. 10 shows a display window of scan modes of the copying machine.

A duplex→duplex button 901 allows the user to designate an operation mode of reading images on the two faces of a document sheet and duplex-copying them on the two faces of a print sheet. A simplex→duplex button 902 allows the user to designate an operation mode of reading an image on one face of a document sheet, and duplex-copying images for two faces read from one face of each of two document sheets on the two faces of one print sheet. A duplex→simplex button 903 allows the user to designate an operation mode of reading images on the two faces of a document sheet, and simplex-printing the front image on an odd page and the backside image on an even page. A page continuous shot duplex button 904 allows the user to designate an operation mode of reading contents on a brochure, and duplex-copying the right page of the brochure on the front face of a print sheet, and the left page of the brochure on the rear face of the print sheet.

Note that the duplex→duplex button 901 or duplex→simplex button 903 is used to designate a both-sided (duplex) scan mode of reading images on the two faces of a document sheet. When the user designates the operation mode using one of these buttons, the following processing is executed. The background colors of a document are extracted, so that the processing results of the color space converters 503 and 504 are OUTa=OUTb.

[Processing]

FIG. 11 is a flowchart showing the processing for reading each document sheet, the two faces of which have identical backgrounds, over a large number of pages using the simultaneous both-sided reader, and adjusting the color reproducibilities of the background images to match each other or to be possibly equal to each other. The CPU 104 executes this processing.

Upon designation of the both-sided scan mode at the operation unit 101, the CPU 104 reads images on the two faces of the first document sheet stacked on the document table 202 using the reading units 501 and 502 (S1101).

The CPU 104 inputs the images respectively read by the reading units 501 and 502 to the background color extraction unit 109. The CPU 104 controls the background color extraction unit 109 to generate the histograms of the front image data and backside image data (S1102) and to extract the signal values of the background color based on the frequencies of occurrence of the signals of the respective RGB channels (S1103).

The CPU 104 selects four grids used in the interpolation operations of each of the color space converters 503 and 504 in correspondence with the signal values of the background color extracted by the background color extraction unit 109 (S1104). Note that the CPU 104 selects four grids of the 3DLUT of the color space converter 503 in correspondence with the signal values of the background color of the image read by the reading unit 501, and four grids of the 3DLUT of the color space converter 504 in correspondence with the signal values of the background color of the image read by the reading unit 502.

The CPU 104 sets the processing results of the signal values of the extracted background colors by the color space converters 503 and 504 to be OUTa(Ra', Ga', Ba') and OUTb (Rb', Gb', Bb'). The CPU 104 makes the search unit 103 search for adjustment values of the 3DLUTs to attain OUTa=OUTb, and acquires the adjustment values of the output values of the grids selected in step S1104 (S1105).

The CPU 104 settles the adjustment values of the 3DLUT, those of the output values of which are smaller, and discards the adjustment values of the other 3DLUT (those of the output values of which are larger) (in other words, the CPU 104 settles that 3DLUT as an original 3DLUT) (S1106) For example, when the output values of the 3DLUT of the color space converter 503 are adjusted, the output values of the 3DLUT of the color space converter 504 are not adjusted (are left unchanged).

The CPU 104 controls the reading units 501 and 502 to read the images of both sides of each document sheet stacked on the document table 202 using the 3DLUT adjusted in this way, and controls the adjusted color space converter 503 or 504 to apply the color space conversion processing to the read images (S1107). Note that the image of the document sheet as the first page may be read again, or image data may be stored in the storage unit 102 in step S1101 and may be used.

Adjustment of Output Values of Grids

Figure 12B:
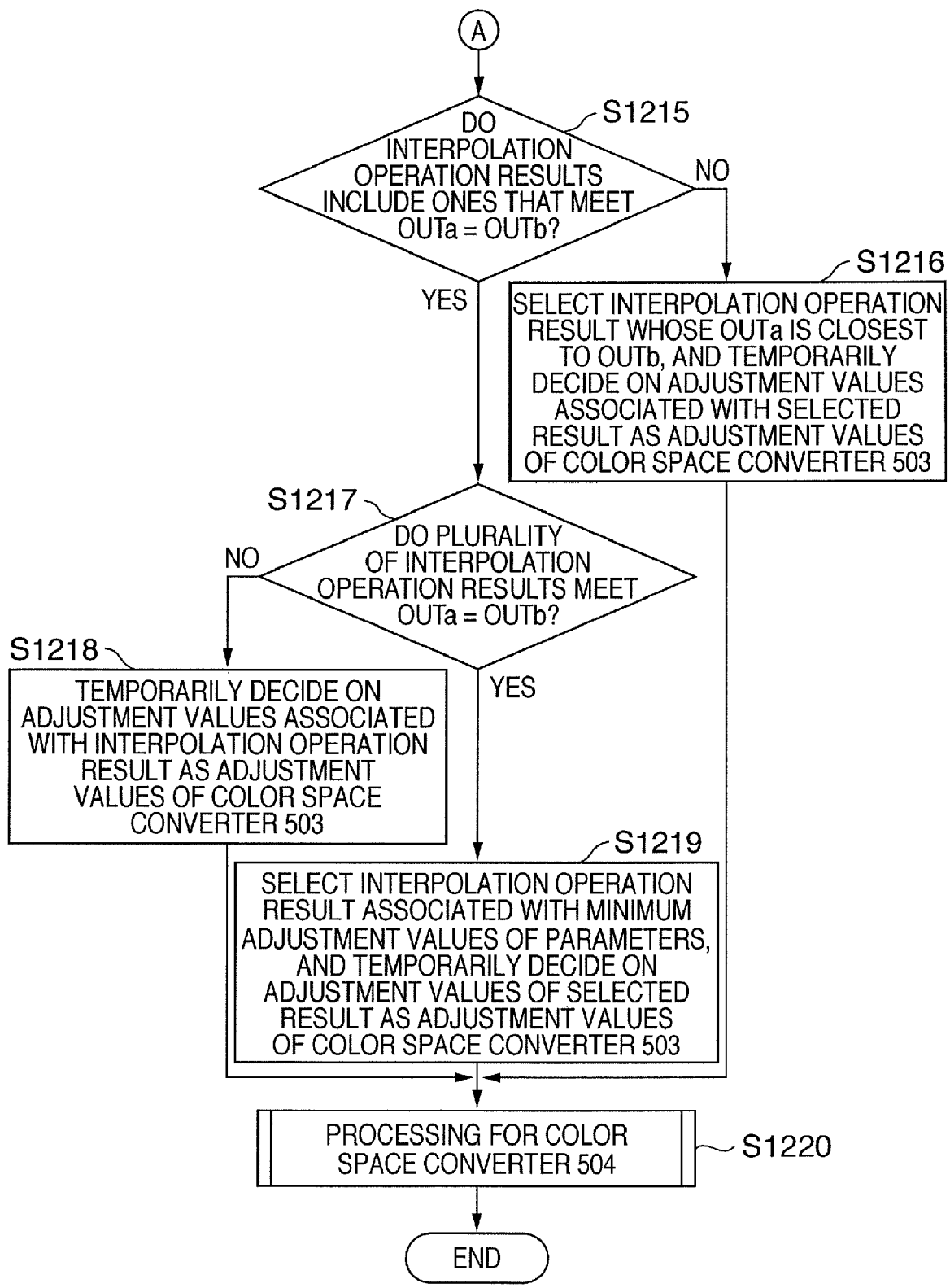

FIGS. 12A and 12B are flowcharts showing the processing (S1105) for adjusting the output values of the grids.

The CPU 104 checks the magnitude relationship among the weighting coefficients A0, A1, A2, and A3 for the input signals of the background color (S1201). For example, if A0>A1>A2>A3, it indicates that the influences on the output values are larger in the order of the grids C3, C2, C1, and C0. Hence, the search unit 103 searches for an adjustment value of a grid corresponding to the largest weighting coefficient first. A case will be explained wherein A0>A1>A2>A3 for the sake of convenience. Therefore, the CPU 104 selects the grid C0 first (S1202).

Figure 13:
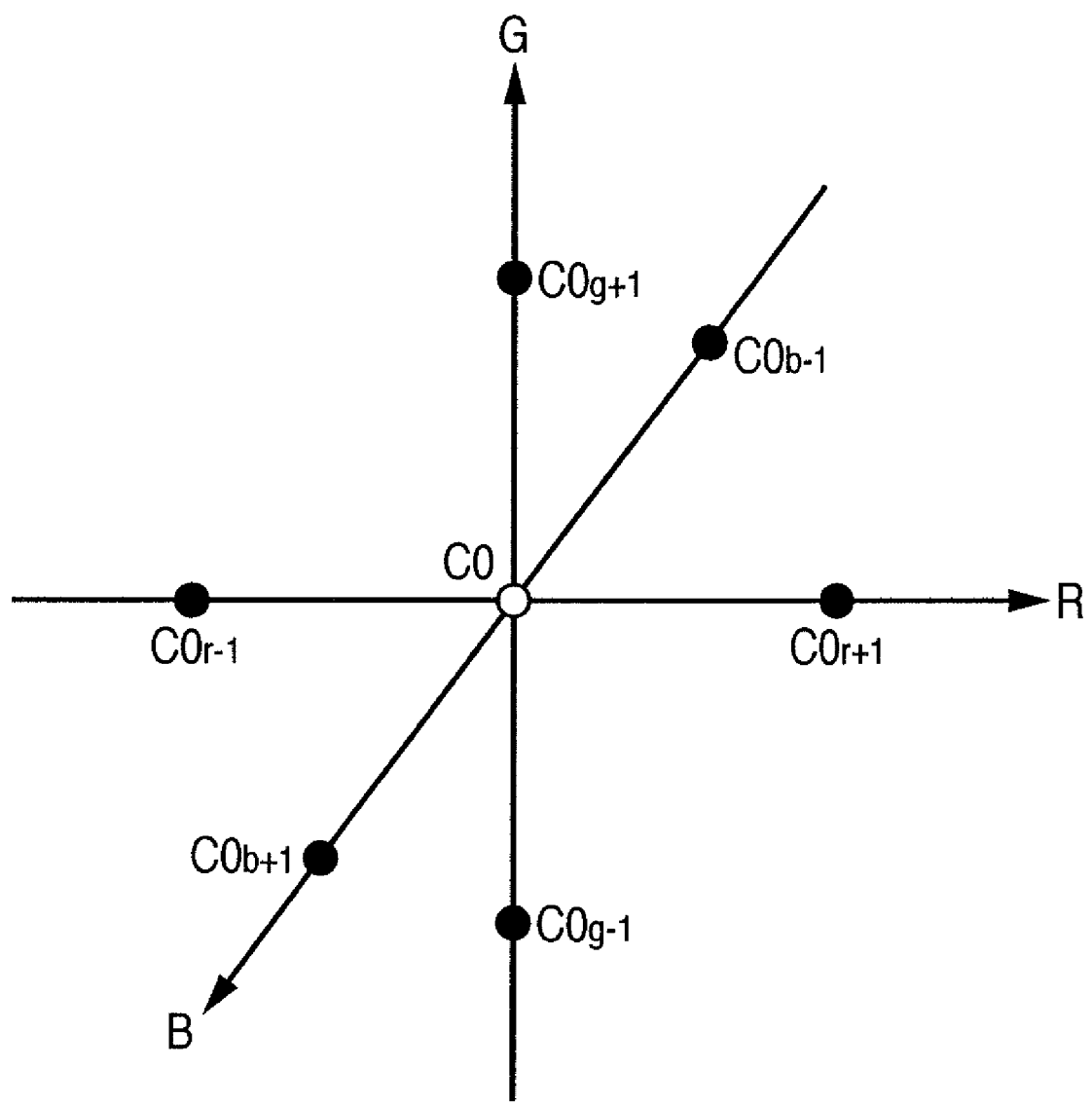
FIG. 13 shows the relationship between a grid for which variation widths are decided, and neighboring grids.

The search unit 103 decides on a variation width of an R parameter $R_{C0}$ set in the grid C0 (S1203), that of a G parameter $G_{C0}$ (S1204), and that of a B parameter $B_{C0}$ (S1205). Note that the variation width of $R_{C0}$ is set between R parameters $R_{C0r+1}$ and $R_{C0r-1}$ which are set in the grids $CO_{r+1}$ and $CO_{r-1}$ neighboring the grid C0 in the R direction. The variation width of $G_{C0}$ is set between G parameters $G_{C0g+1}$ and $G_{C0g-1}$ which are set in the grids $CO_{g+1}$ and $CO_{g-1}$ neighboring the grid C0 in the G direction. The variation width of $B_{C0}$ is set between B parameters $B_{C0b+1}$ and $B_{C0b-1}$ which are set in the grids $CO_{b+1}$ and $CO_{b-1}$ neighboring the grid C0 in the B direction. FIG. 13 shows the relationship between the grid for which the variation widths are decided on, and neighboring grids.

The search unit 103 then changes the output values of the respective parameters set in the grid C0 by the aforementioned variation widths to calculate output values OUTa corresponding to the signal values INa of the background color by interpolation operations, and stores the calculation results in the storage unit 102 in association with the adjustment values of the respective parameters of the grid C0 (S1206). Note that the adjustment values indicate values obtained by changing the output values of the respective parameters set in the grid C0 within the ranges of the variation widths. A change step may be a predetermined unit equal to or larger than 1.

The CPU 104 selects the grid (the grid C1 in this example) with the next largest weighting coefficient (S1207).

The search unit 103 decides on the variation width of an R parameter $R_{c1}$ set in the grid C1. In this case, the search unit 103 determines whether or not the interpolation operations required to search for the adjustment values at grids $C1_{r+1}$ and $C1_{r-1}$ which neighbor the grid C1 in the R direction have already been made (S1208). That is, in case of this example, whether or not the grid C0 is the grid ($C1_{r+1}$ or $C1_{r-1}$) which neighbors in the R direction with respect to the grid C1. If the grid that neighbors in the R direction is not a searched grid, the search unit 103 decides on the variation width as in step S1203 (S1209). On the other hand, if any of the grids which neighbor in the R direction are a searched grid, the search unit 103 decides on a range including an R parameter of an unsearched grid and the variation width set for the R parameter of the searched grid as a variation width of the parameter $R_{c1}$ of the grid (S1210). In this example, a specific example will be given. Then, the variation width of $R_{c1}$ is decided on as follows.

If $C1_{r+1} \neq C0$ and $C1_{r-1} \neq C0$, from $R_{c1r+1}$ to $R_{c1r-1}$

If $C1_{r+1} = C0$, from $R_{c0r+1}$ to $R_{c1r-1}$

If $C1_{r-1} = C0$, from $R_{c1r+1}$ to $R_{c0r-1}$ \hfill (3)

Next, the search unit 103 executes the same processes as those in steps S1208 to S1210 for G and B parameters, and decides on the variation widths of the G and B parameters (S1211, S1212).

The search unit 103 then changes the output values of the respective parameters set in the grid C1 by the aforementioned variation widths to calculate output values OUTa corresponding to the signal values INa of the background color by interpolation operations, and stores the calculation results in the storage unit 102 in association with the adjustment values of the respective parameters of the grid C1 (S1213).

The CPU 104 then checks if the processing for calculating the output values OUTa for the signal values INa of the background color by interpolation operations by changing the output values of parameters set in the grids for all the four grids is complete (S1214). If the grids to be processed still remain, the process returns to step S1207. If it is determined that the processing for all the four grids is complete, the CPU 104 checks if the interpolation operation results stored in the storage unit 102 include ones which meet OUTa=OUTb (S1215). Note that OUTb has already been acquired from the color space converter 504 in step S1105.

If the interpolation operation results that meet OUTa=OUTb are not found, the CPU 104 selects an interpolation operation result whose OUTa is closest to OUTb. The CPU 104 temporarily decides on the adjustment values of the respective parameters of the grid associated with that interpolation operation result as those of the 3DLUT of the color space converter 503 (S1216). If an interpolation operation result that meets OUTa=OUTb is found, the CPU 104 checks if a plurality of interpolation operation results meet OUTa=OUTb are found (S1217). If only one interpolation operation result that meets OUTa=OUTb is found, the CPU 104 temporarily decides on the adjustment values of the respective parameters of the grid associated with that interpolation operation result as those of the 3DLUT of the color space converter 503 (S1218). If a plurality of interpolation operation results meet OUTa=OUTb are found, the CPU 104 selects an interpolation operation result associated with the minimum adjustment values of the respective parameters for the output values of the grid. Then, the CPU 104 temporarily decides on these adjustment values as those of the 3DLUT of the color space converter 503 (S1219).

Next, the CPU 104 executes the processes in steps S1201 to S1219 for the color space converter 504 (S1220).

The CPU 104 compares the adjustment values of the output values by the temporarily decided adjustment values of the color space converters 503 and 504. Then, as described above, the CPU 104 settles the adjustment values of the 3DLUT, those of the output values of which are smaller, and discards the adjustment values of the 3DLUT, those of the output values of which are larger in step S1106. Likewise, if a plurality of interpolation operation results that meet OUTa=OUTb are found, the CPU 104 selects the interpolation operation result associated with the minimum adjustment amounts of the respective parameters for the output values of the grid in step S1219. As the comparison method in these processes, for example, the absolute values of the adjustment amounts of respective parameters may be simply integrated and compared. Alternatively, let $\Delta r$, $\Delta g$, and $\Delta b$ be the adjustment amounts of respective parameters. Then, an adjustment amount per grid may be calculated as $\sqrt{(\Delta r^2 + \Delta g^2 + \Delta b^2)}$ and these adjustment amounts may be compared.

In this way, upon reading images of both sides of each document sheet having identical backgrounds over a large number of pages, the background color is extracted. Then, the output values of the 3DLUT of the color space converter 503 or 504 in association with the background color are adjusted to make the color reproducibilities of the background images in the front and backside image data match each other or be as close to each other as possible.

Second Embodiment

Image processing according to the second embodiment of the present invention will be described below. Note that the same reference numerals in the second embodiment denote the same components as in the first embodiment, and a detailed description thereof will not be repeated.

[Arrangement]

Figure 14:
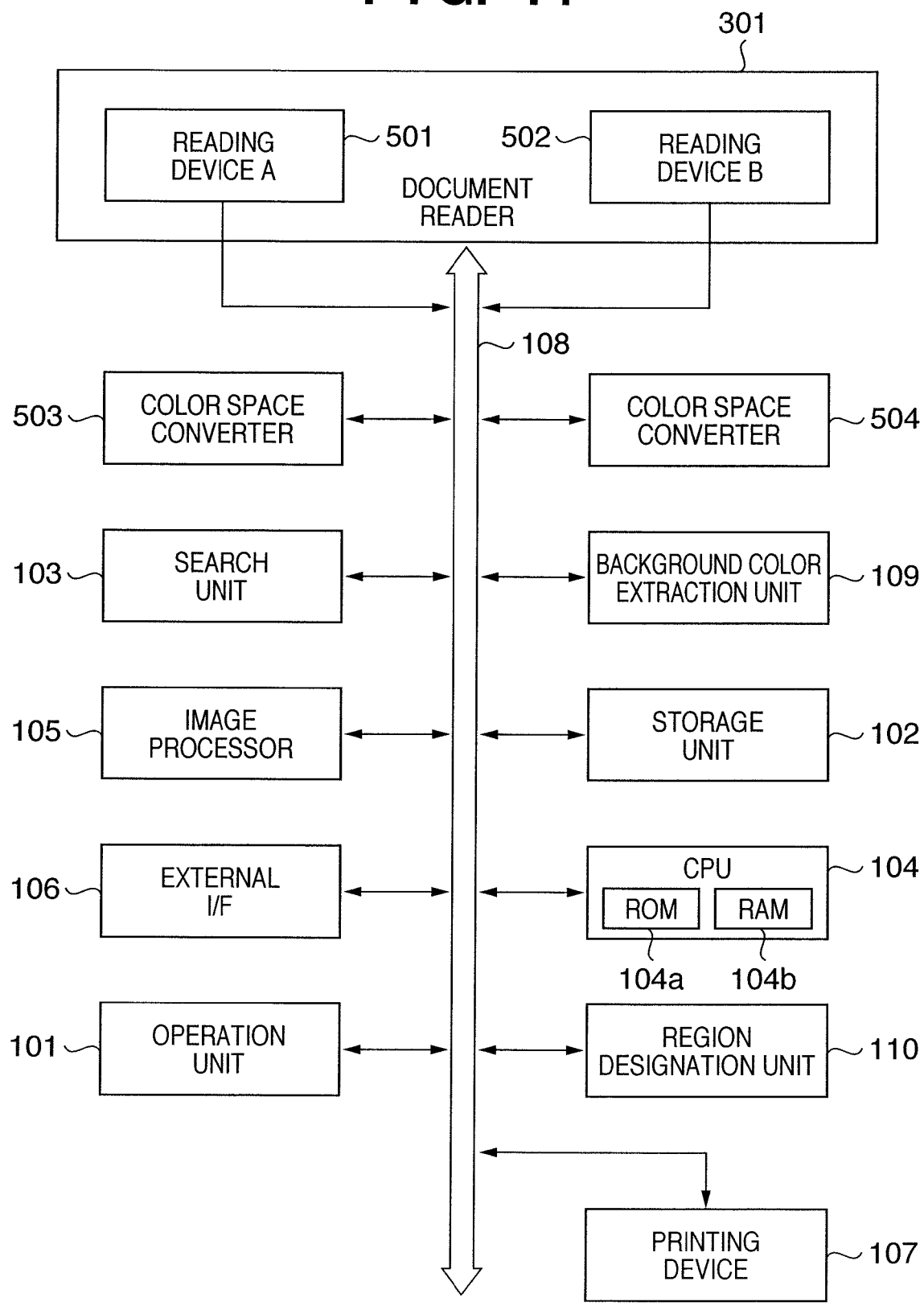
FIG. 14 is a block diagram showing the arrangement of a simultaneous both-sided reader according to the second embodiment.

FIG. 14 is a block diagram showing the arrangement of a simultaneous both-sided reader according to the second embodiment. Note that the mechanical structure of the document reader 301 is substantially the same as that shown in FIG. 2, and a repetitive description thereof will be avoided.

The simultaneous both-sided reader of the second embodiment comprises a region designation unit 110 used to designate an extraction region of the background color in addition to the arrangement shown in FIG. 5. The region designation unit 110 accepts from the user the designations of regions where the colors (color reproducibilities) are to be matched on the two faces of a document sheet via the operation unit 101.

[Example of Document]

FIG. 15A shows an example of a front image of a document sheet 1401, and FIG. 15B shows an example of a backside image of the document sheet 1401.

On the front face of the document sheet 1401, a text image 1402 and graphics image 1403 are laid out on a background color 1406. Likewise, on the rear face, a text image 1502 and graphics image 1503 are laid out on a background color 1506. Note that rectangles 1404 and 1405 indicated by the broken lines represent a user designated region, and are not images included those of the document sheet 1401, as will be described in detail later.

An example of the processing of the images of the document sheet shown in FIGS. 15A and 15B will be described below.

[Designation of Region]

Figure 16:
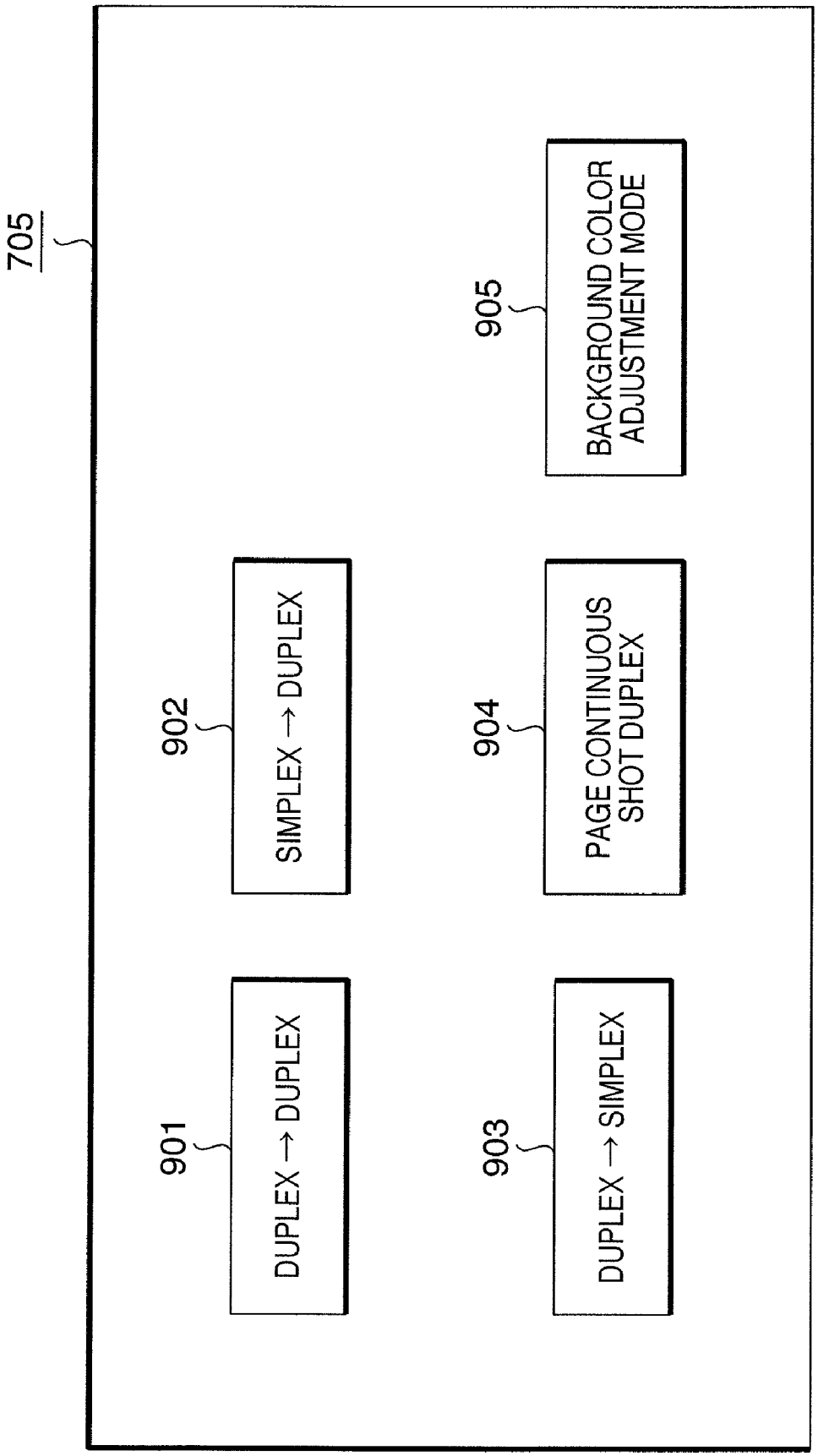
FIG. 16 shows a display window of scan modes of a copying machine.

The user places a document on the document table 202 of the simultaneous both-sided reader, and presses the duplex button 806 (see FIG. 9) displayed on the screen 705 of the operation unit 101. With this operation, a window shown in FIG. 16 is displayed on the screen 705. Note that FIG. 16 shows the display window of scan modes of the copying machine. A background color adjustment button 905 allows the user to designate matching of the color reproducibilities of the background colors in a both-sided (duplex) scan. Note that other buttons have already been explained with reference to FIG. 10, and a repetitive description thereof will be avoided.

The user presses the background color adjustment button 905 to highlight that button, and then presses the duplex→duplex button 901 or duplex→simplex button 903 in that state. With this operation, the region designation unit 110 displays a window shown in FIG. 17 on the screen 705. Note that FIG. 17 shows a region designation window used to designate a region where the color reproducibilities are to be adjusted.

Figure 17:
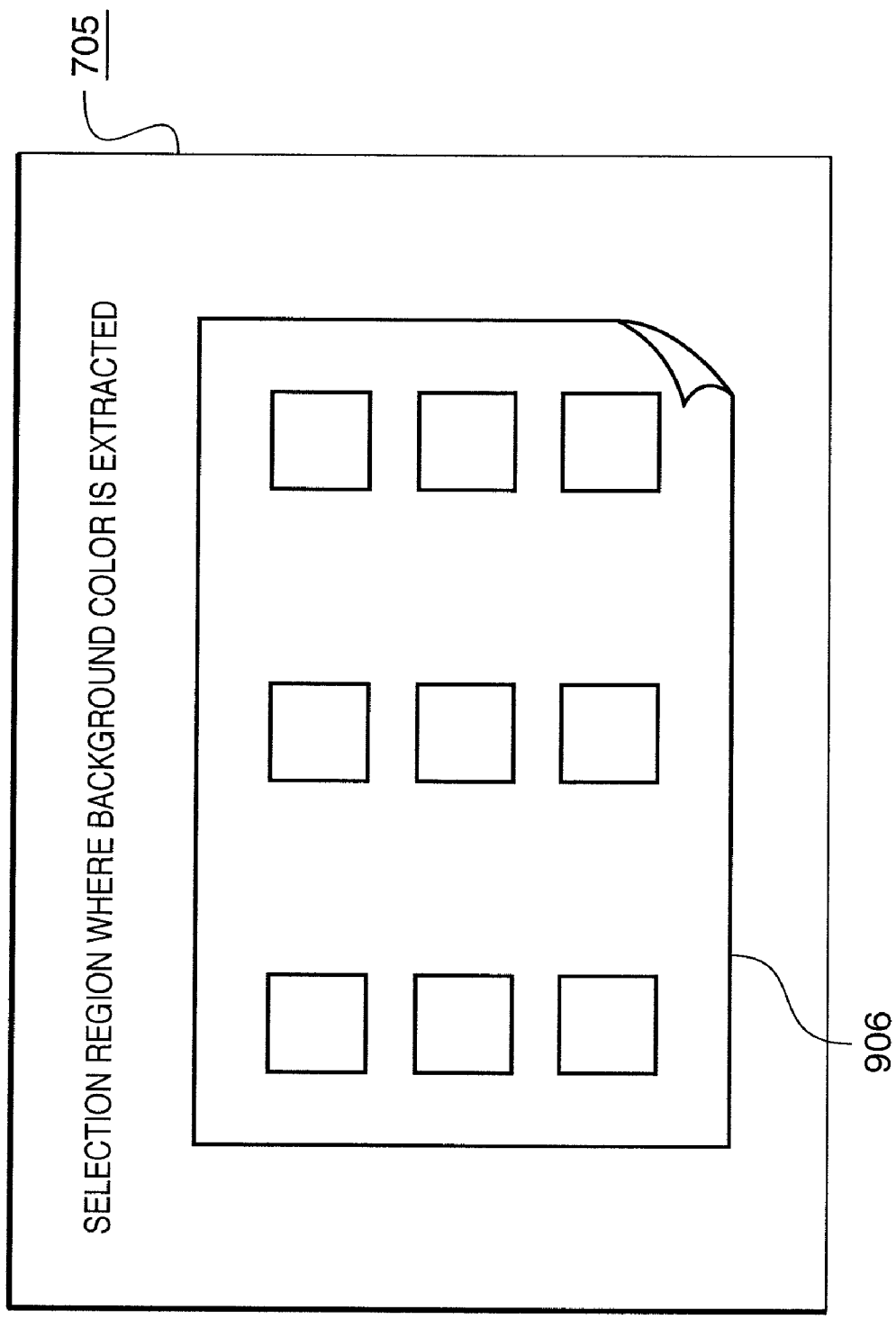
FIG. 17 shows a region designation window used to designate a region where the color reproducibilities are to be adjusted.

FIG. 17 shows an example in which nine rectangular icons (□) used to designate a region where the color reproducibilities of the background colors on a document are to be adjusted are displayed on the region designation window 906. The user presses one or more rectangular icons to designate one or a plurality of regions where the color reproducibilities are to be adjusted. Note that the number of rectangular icons is not limited to nine, and it may be either larger or smaller than nine. When the user places the document on the document table 202, if he or she sets the size and orientation of the document, the size and orientation (portrait or landscape) of the region designation window 906 can be changed in correspondence with the set document size and orientation. Of course, the orientation of the document may be displayed in correspondence with the readable document size.

The rectangle 1404 indicated by the broken line in each of FIGS. 15A and 15B corresponds to the region where the color reproducibilities are to be adjusted designated by the user, and a color included in the rectangle 1405 becomes the designated background color. The rectangles 1404 and 1405 on the two faces of the document sheet 1401 have the same coordinate positions.

[Processing]

Figure 18:
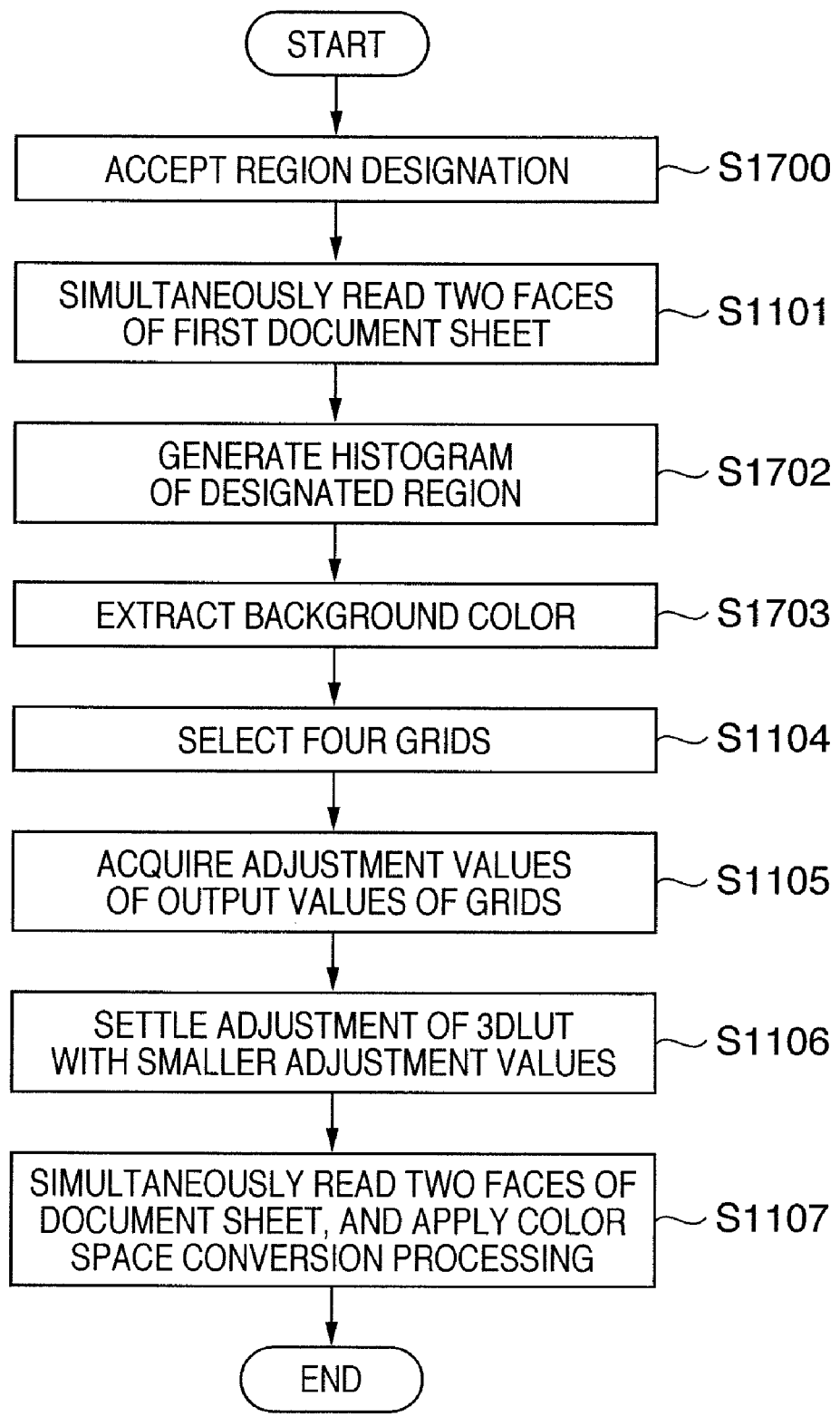
FIG. 18 is a flowchart showing the processing of the second embodiment for reading each document sheet, the two faces of which have identical backgrounds, over a large number of pages by the simultaneous both-sided reader, and adjusting the color reproducibilities of the background images to match each other or to be possibly equal to each other.

FIG. 18 is a flowchart showing the processing of the second embodiment for reading each document sheet, the two faces of which have identical backgrounds, over a large number of pages by the simultaneous both-sided reader, and adjusting the color reproducibilities of the background images to match each other or to be possibly equal to each other. The CPU 104 executes this processing.

When the user designates a region where the color reproducibilities are to be adjusted, and then presses the start key 701 (see FIG. 8), the CPU 104 accepts the region designation (S1700), and reads images of both sides of a first document sheet (S1101).

Next, the CPU 104 controls the background color extraction unit 109 to generate histograms (including pixel values of both sides) in association with the user designated region (having the same coordinate positions on the front and rear faces) (S1702), and extracts colors that exhibit maximum frequencies of occurrence as background colors (S1703). Or the CPU 104 may extract the average values of all pixel values in the designated region as the background colors. The size of the region for which the histogram is to be generated (corresponding to the rectangle 1405) is stored in advance in the storage unit 102. However, it is preferable to be able to change that size even after installation of the both-sided reader.

Since the subsequent processes are the same as those of the first embodiment described with reference to FIG. 11, a detailed explanation thereof will not be given.

In this way, upon reading images of both sides of each of document sheets with identical backgrounds over a larger number of pages, the background colors of the region designated by the user are extracted. Then, the output values of the 3DLUT of the color space converter 503 or 504 in association with the background color are adjusted to make the color reproducibilities of the background images in the front and backside image data match each other or be close to each other as much as possible. Therefore, the color reproducibilities of the background images in the front and backside image data can be adjusted to match each other or to be equal to each other as much as possible.

Third Embodiment

Image processing according to the third embodiment of the present invention will be described below. Note that the same reference numerals in the third embodiment denote the same components as in the first and second embodiments, and a detailed description thereof will not be repeated.

Figure 19B:
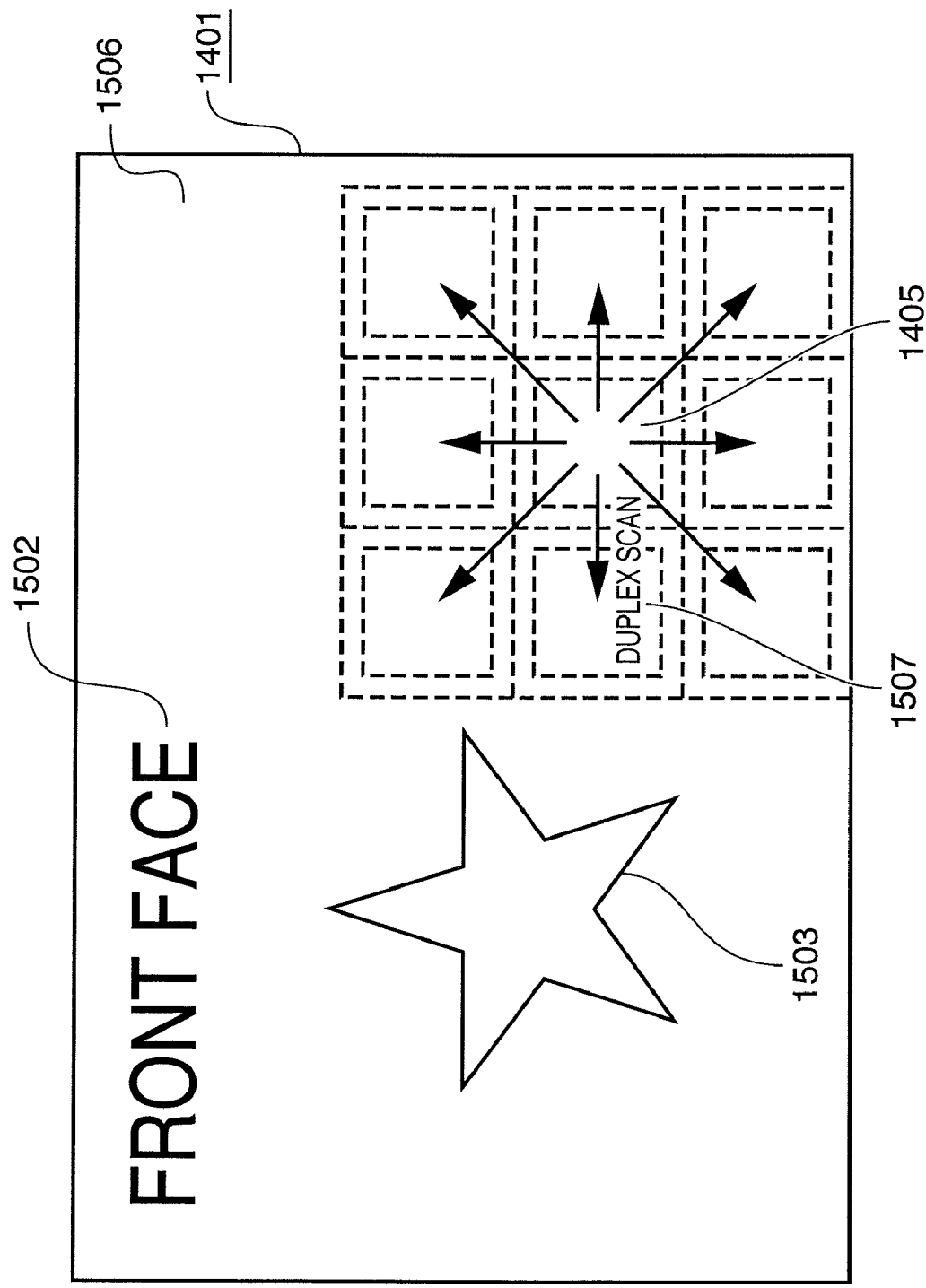
FIG. 19B is a view for explaining shift of a designated region.

Upon designating a region by the method of the second embodiment, for example, the designated region may include a text image 1507, as shown in FIG. 19A, which influences the histogram generated to extract the background color, and a correct background color may not often be extracted. In this case, the average value of all the pixel values of the designated region does not indicate a correct background color, either.

Figure 20:
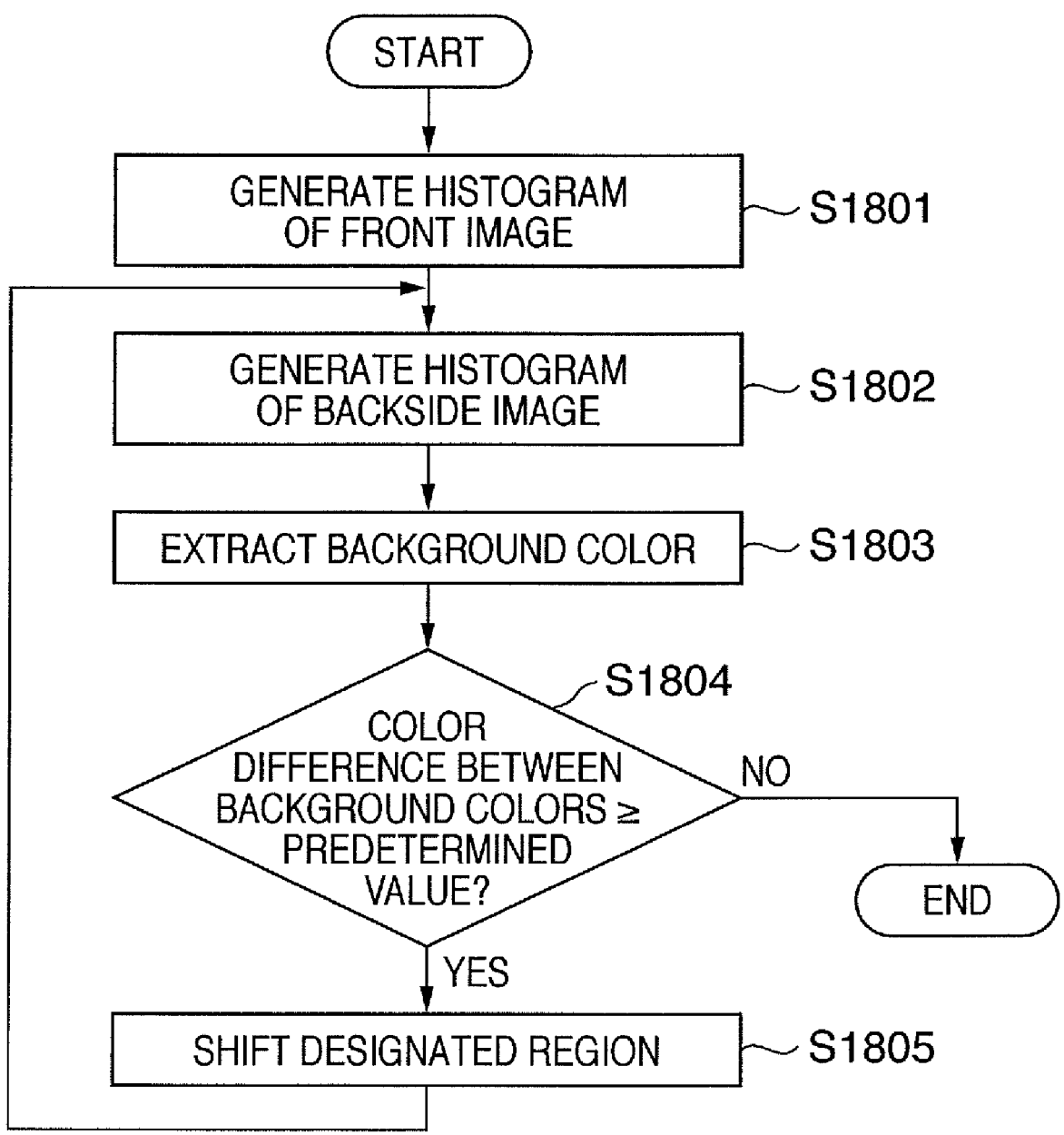
FIG. 20 is a flowchart showing the extraction processing of a background color in consideration of a case wherein the designated region includes an image other than a background according to the third embodiment.

FIG. 20 is a flowchart showing the extraction processing (S1702, S1703) of the background colors in consideration of a case wherein the designated region 1404 includes an image other than the background.

The CPU 104 controls the background color extraction unit 109 to generate a histogram of the designated region 1404 based on the front image data (S1801) and to generate a histogram of the designated region 1404 based on the backside image data (S1802). Then, the CPU 104 extracts the background colors of the front and backside images (S1803), and compares the two background colors to check if they have a color difference equal to or larger than a predetermined value (S1804).

If the two background colors have the color difference equal to or larger than the predetermined value, the CPU 104 determines that the designated region 1404 on the front or backside image includes an image other than the background image. In this case, the CPU 104 shifts the designated region for the backside image to one of positions around the designated region 1404 (S1805), as exemplified in FIG. 19B. The process then returns to step S1802.

The CPU 104 repeats the aforementioned processes. If the color difference between the background colors of the front and backside images is less than the predetermined value, the process ends.

Fourth Embodiment

Image processing according to the fourth embodiment of the present invention will be described below. Note that the same reference numerals in the fourth embodiment denote the same components as in the first to third embodiments, and a detailed description thereof will not be repeated.

Figure 21:
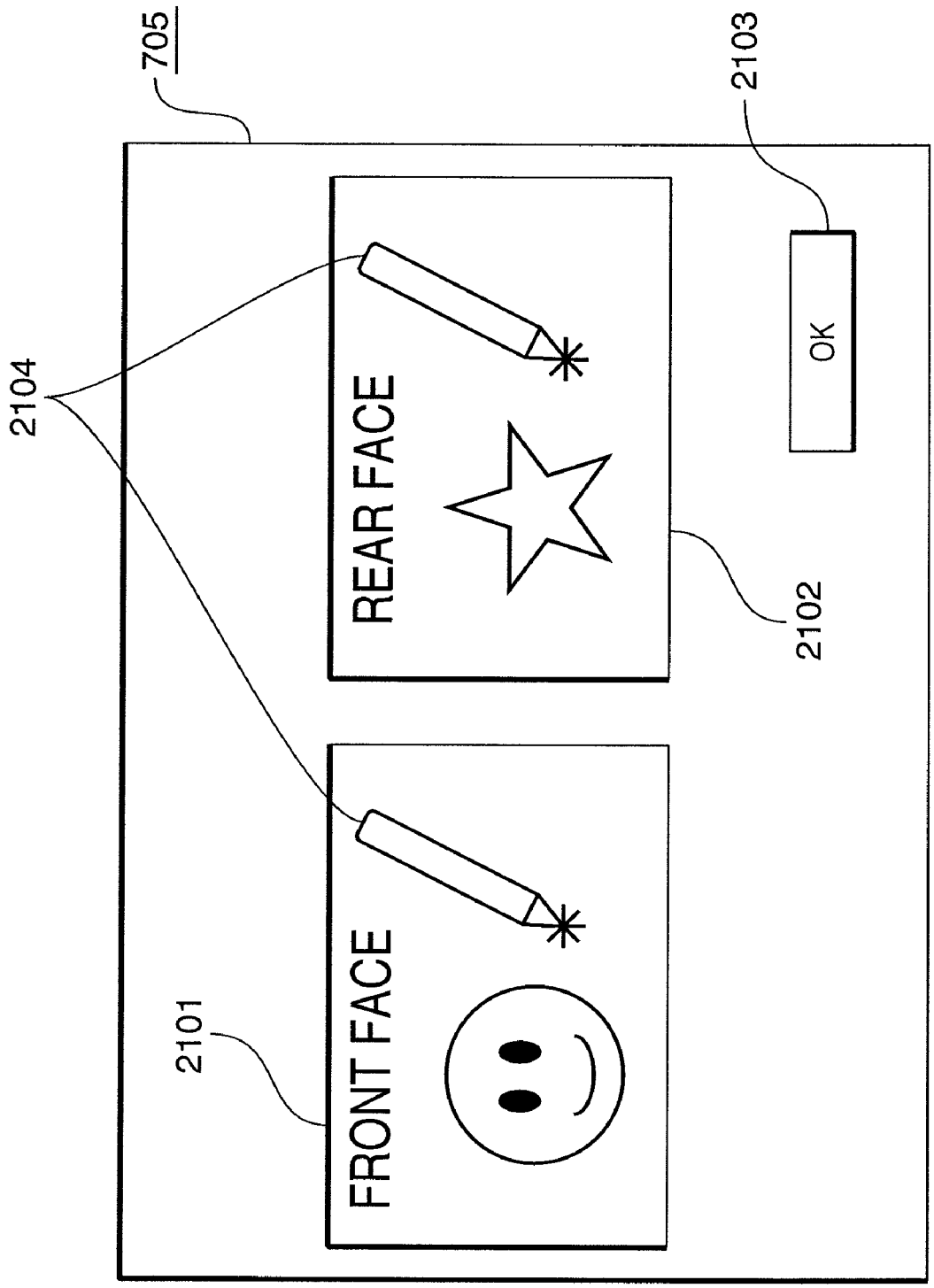
FIG. 21 shows a background color designation window.

FIG. 21 shows a background color designation window. The region designation unit 110 displays the background color designation window on the screen 705 when the user presses the background color adjustment button 905 to highlight that button, and then presses the duplex→duplex button 901 or duplex→simplex button 903 in that state.

That is, the CPU 104 reads images of both sides of a first document sheet placed on the document table 202, stores the read images in the storage unit 102, and instructs the region designation unit 110 to display the background color designation window.

The background color designation window displays preview images 2101 and 2102 of the front and backside images. The user touches, using a stylus 2104 or the like, positions corresponding to the background colors, where the color reproducibilities are to be adjusted, on the two preview images, and then presses an OK button 2103, thus designating the background colors.

The CPU 104 receives a plurality of pieces of coordinate information in the preview images corresponding to the positions designated by the user from the region designation unit 110. The CPU 104 then executes the subsequent processes to have a predetermined region having the input coordinate position as the center as the designated region 1404. Since the subsequent processes are the same as those in the second embodiment, a detailed description thereof will not be repeated.

Modification of Embodiments

In the first embodiment, when the signal values of the background colors of the front and backside images extracted by the background color extraction unit 109 have a color difference equal to or larger than a predetermined value, a warning dialog is preferably displayed on the screen 705. In the second to fourth embodiments, when the signal values of the background colors of the front and backside images in the region designated by the user have a color difference equal to or larger than a predetermined value, the warning dialog is also preferably displayed on the screen 705.

FIG. 22 shows an example of the warning dialog.

The warning dialog displays an exclamation mark 2201 that allows the user to easily recognize the warning. Furthermore, the warning dialog displays a text indication 2202 that prompts the user to determine whether to continue or cancel the reading processing, a Yes button 2203 that allows the user to continue reading without adjusting the background colors, and a No button 2204 that allows the user to cancel reading.

By displaying the warning dialog, an error such that the adjustment processing of the background colors is applied to a document which apparently has different background colors to form images with tints that the user did not intend, can be prevented. Of course, a voice or buzzer warning may be produced.

The screen 705 displays a "front background priority" button, T"rear background priority" button, and "automatic color adjustment" button, and the user selects one of them. When the user selects the "front background priority" button, the CPU 104 adjusts the 3DLUT for the rear face of the color space converter 504. When the user selects the "rear background priority" button, the CPU 104 adjusts the 3DLUT for the front face of the color space converter 503. When the user selects the "automatic color adjustment" button, the CPU 104 can adjust the 3DLUT with smaller adjustment amounts, as has been described in the first embodiment.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-327633, filed Dec. 4, 2006, which is hereby incorporated by reference herein in its entirety.

What is claimed is:

1. An image reading apparatus for reading images of both sides of a document sheet, comprising:
    a first reader, arranged to read a front image of the document sheet;
    a second reader, arranged to read a backside image of the document sheet;
    an extractor, arranged to generate first histograms of plural color components from image data of the image read by said first reader to extract a first background color of the image read by said first reader using the first histograms, and to generate second histograms of the plural color components from image data of the image read by said second reader to extract a second background color of the image read by said second reader using the second histograms;
    a first color processor, arranged to apply color processing to the image read by said first reader using a first lookup table;
    a second color processor, arranged to apply color processing to the image read by said second reader using a second lookup table; and
    an adjustor, arranged to adjust output values of grid points of the first or second lookup table so as to make an output of said first color processor for the first background color be approximately equal to an output of said second color processor for the second background color,
    wherein the grid points of the first lookup table correspond to vertices of a three-dimensional shape which encloses the first background color extracted by said extractor, and the grid points of the second lookup table correspond to vertices of a three-dimensional shape which encloses the second background color extracted by said extractor, and wherein said adjustor adjusts either the output values of the grid points of the first lookup table or the output values of the grid points of the second lookup table so that adjustment amounts of the output values are those of which are smaller with respect to a relationship between the first lookup table and the second lookup table.

2. The apparatus according to claim 1, further comprising an input section arranged to input a user instruction that designates a region from which said extractor extracts the background colors.

3. The apparatus according to claim 2, further comprising a preview section arranged to display preview images of both sides of the document sheet, wherein said input section inputs the user instruction as coordinate information in the preview images.

4. The apparatus according to claim 2, further comprising:
- a determiner, arranged to compare the first background color and the second background color extracted by said extractor from a designated region indicated by the user instruction, and to determine whether or not a color difference between the first and second background colors is larger than a predetermined value; and
- a modifier, arranged to shift, when said determiner determines that the color difference is larger than the predetermined value, a region from which the second background color is to be extracted to a position around the designated region, and to make said extractor extract the second background color again.

5. A method of an image reading apparatus having a first reader which reads a front image of the document sheet, a second reader which reads a backside image of the document sheet, a first color processor which applies color processing to the image read by the first reader using a first lookup table, and a second color processor which applies color processing to the image read by the second reader using a second lookup table, the method comprising the steps of:
- generating first histograms of plural color components from image data of the image read by the first reader to extract a first background color of the image read by the first reader using the first histograms;
- generating second histograms of the plural color components from image data of the image read by the second reader to extract a second background color of the image read by the second reader using the second histograms; and
- executing adjustment which adjusts output values of grid points of the first or second lookup table so as to make an output of the first color processor for the first background color be approximately equal to an output of the second color processor for the second background color, wherein the grid points of the first lookup table correspond to vertices of a three-dimensional shape which encloses the extracted first background color, and the grid points of the second lookup table correspond to vertices of a three-dimensional shape which encloses the extracted second background color, and wherein in the adjustment, either the output values of the grid points of the first lookup table or the output values of the grid points of the second lookup table are adjusted so that adjustment amounts of the output values are those of which are smaller with respect to a relationship between the first lookup table and the second lookup table.

6. A non-transitory computer-readable storage medium storing a computer-executable program for causing a computer to perform a method of an image reading apparatus having a first reader which reads a front image of the document sheet, a second reader which reads a backside image of the document sheet, a first color processor which applies color processing to the image read by the first reader using a first lookup table, and a second color processor which applies color processing to the image read by the second reader using a second lookup table, the method comprising the steps of:
- generating first histograms of plural color components from image data of the image read by the first reader to extract a first background color of the image read by the first reader using the first histograms;
- generating second histograms of the plural color components from image data of the image read by the second reader to extract a second background color of the image read by the second reader using the second histograms; and
- executing adjustment which adjusts output values of grid points of the first or second lookup table so as to make an output of the first color processor for the first background color be approximately equal to an output of the second color processor for the second background color, wherein the grid points of the first lookup table correspond to vertices of a three-dimensional shape which encloses the extracted first background color, and the grid points of the second lookup table correspond to vertices of a three-dimensional shape which encloses the extracted second background color, and wherein in the adjustment, either the output values of the grid points of the first lookup table or the output values of the grid points of the second lookup table are adjusted so that adjustment amounts of the output values are those of which are smaller with respect to a relationship between the first lookup table and the second lookup table.

* * * * *